United States Patent [19]

Kamihara et al.

[11] Patent Number: 5,720,030
[45] Date of Patent: Feb. 17, 1998

[54] PREPROCESS METHOD, INFORMATION READ/WRITE METHOD, INPUT/OUTPUT DEVICE AND READ/WRITE DEVICE

[75] Inventors: Yoshiyuki Kamihara; Takatoshi Sugita, both of Nagano, Japan

[73] Assignee: Seiko Epson Corporation, Japan

[21] Appl. No.: 429,591

[22] Filed: Apr. 27, 1995

[30] Foreign Application Priority Data

| Aug. 22, 1994 | [JP] | Japan | 6-196628 |
| Jan. 11, 1995 | [JP] | Japan | 7-002948 |
| Mar. 13, 1995 | [JP] | Japan | 7-052937 |

[51] Int. Cl.⁶ ............................................. G06F 11/00
[52] U.S. Cl. .................... 395/183.18; 395/182.06; 371/21.6
[58] Field of Search ................ 395/183.18, 182.06; 371/21.1, 21.2, 21.6, 51.1, 40.1, 40.2, 40.3, 21.4; 365/200, 201

[56] References Cited

U.S. PATENT DOCUMENTS

| 4,348,761 | 9/1982 | Berger | 371/21 |
| 4,821,251 | 4/1989 | Hosoya | 369/44 |
| 4,942,565 | 7/1990 | Lagadec | 369/59 |
| 5,077,720 | 12/1991 | Takagi et al. | 369/59 |
| 5,233,487 | 8/1993 | Christensen et al. | 360/77.04 |
| 5,412,667 | 5/1995 | Havemose | 371/37.5 |
| 5,422,890 | 6/1995 | Klingspom et al. | 371/21.6 |
| 5,475,693 | 12/1995 | Christopherson et al. | 371/21.4 |

FOREIGN PATENT DOCUMENTS

| 0 559 449 A2 | 9/1993 | European Pat. Off. | G11B 7/007 |
| 0 606 157 A2 | 7/1994 | European Pat. Off. | C11B 27/10 |
| 63-81661 | 4/1988 | Japan | G11B 20/12 |

Primary Examiner—Robert W. Beausoliel, Jr.
Assistant Examiner—Joseph E. Palys
Attorney, Agent, or Firm—Harness, Dickey & Pierce, P.L.C.

[57] ABSTRACT

An operating portion is included in an input/output section of an information read/write device. The operating portion judges whether or not a sector is usable on the basis of medium position information and record position information. A device information storing portion is inserted between a read/write portion and a communication portion. Memory capacity of the device information storing portion is equal to or larger than a data read/write unit. Read/write information on the recording medium is temporarily developed into the device information storing portion, so that information is transferred in blocks of read/write unit that can be handled in an OS.

5 Claims, 12 Drawing Sheets

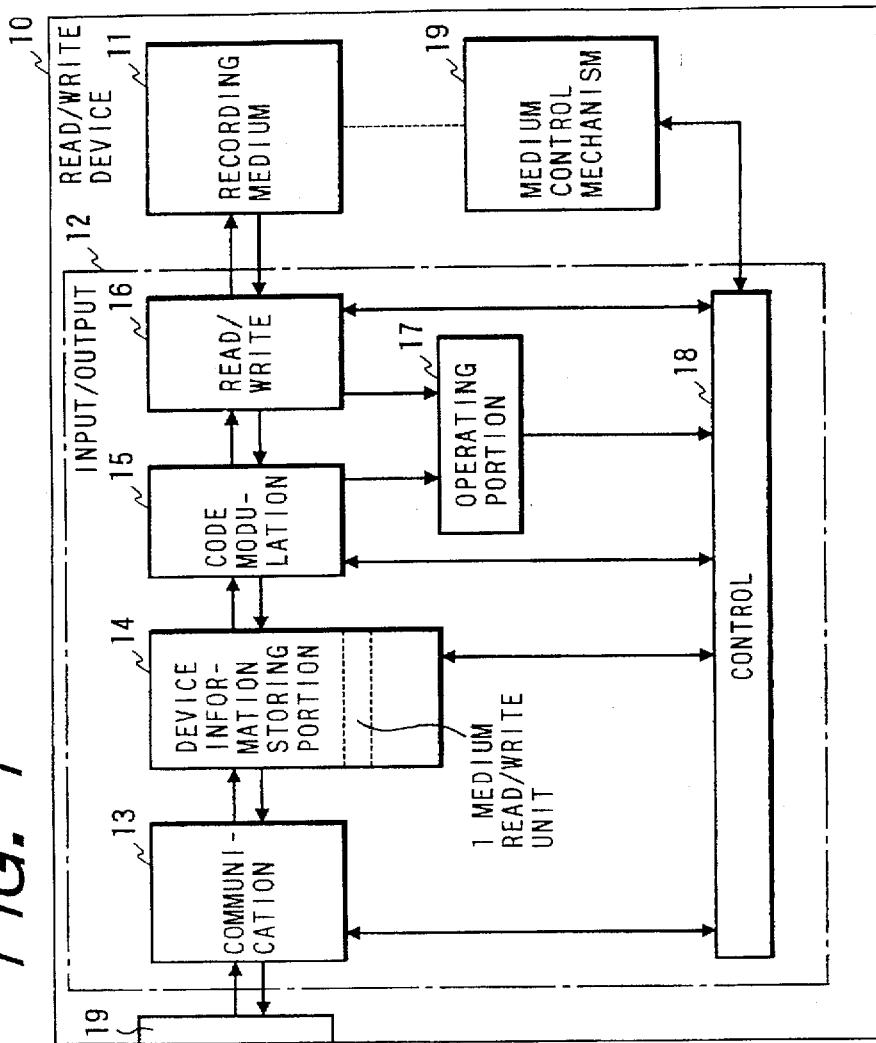
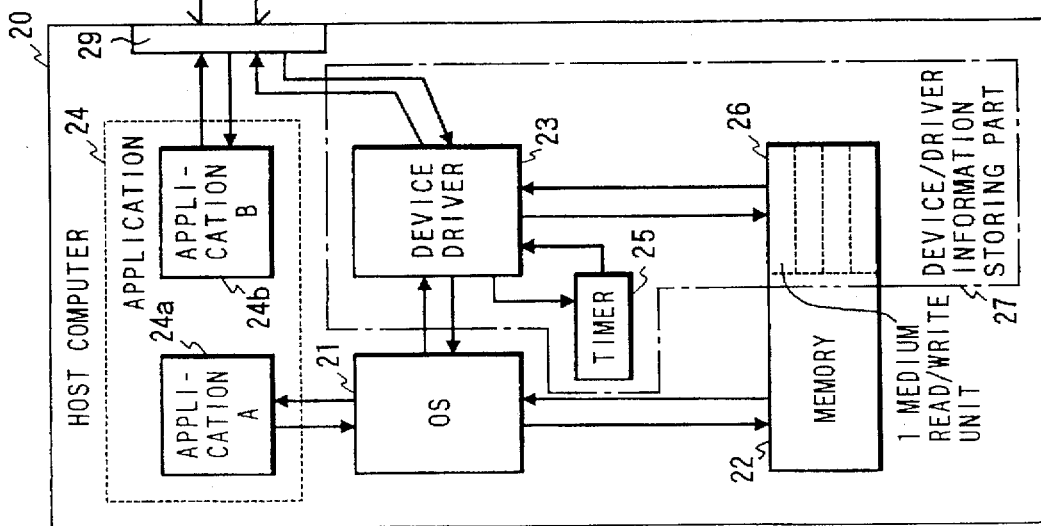
FIG. 1

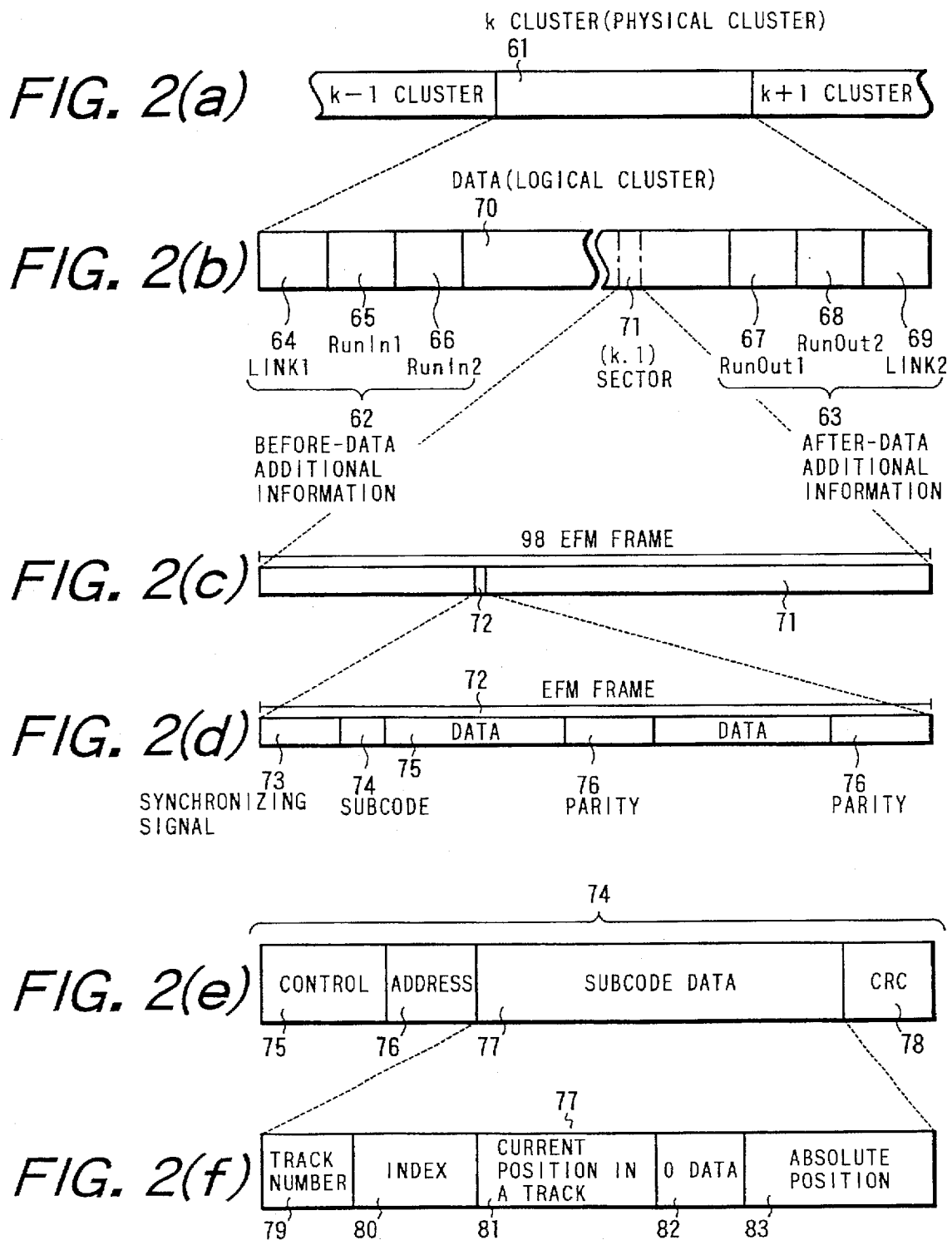

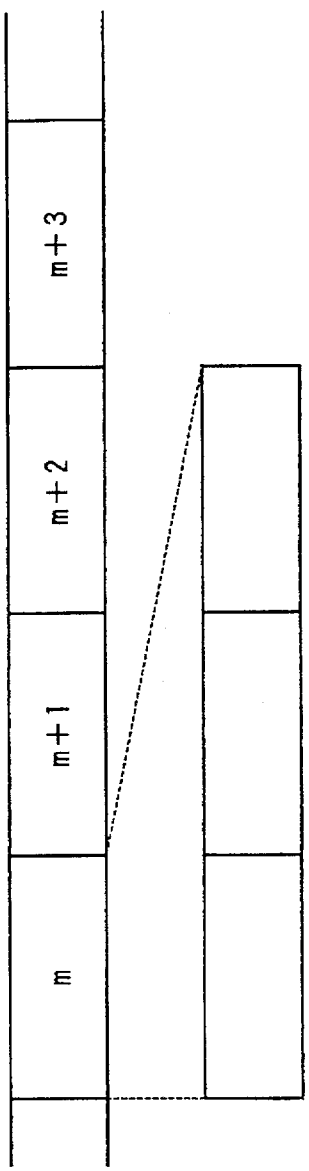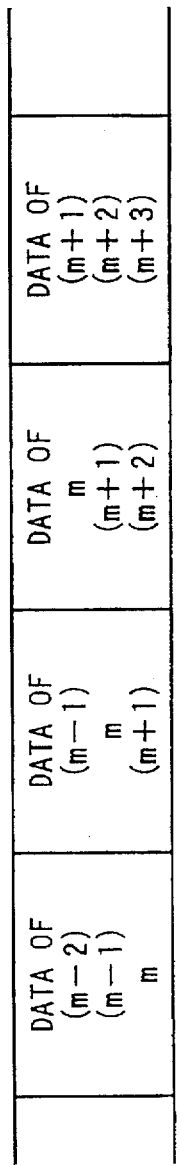
FIG. 3(a) ALL DATA BEFORE SCRAMBLE
FIG. 3(b) DATA OF m AFTER SCRAMBLE
FIG. 3(c) DATA OF (m+1) AFTER SCRAMBLE
FIG. 3(d) ALL DATA AFTER SCRAMBLE

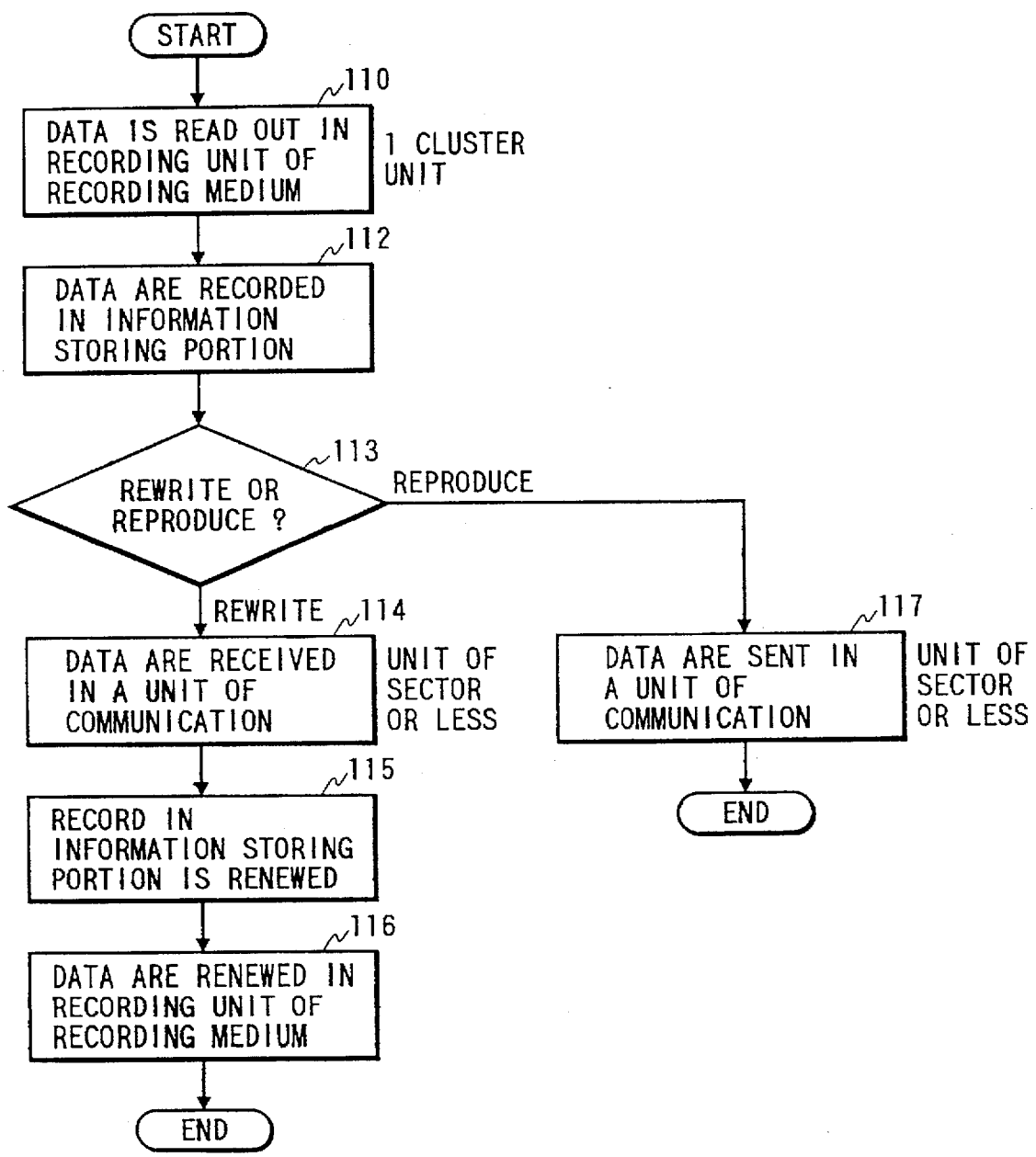

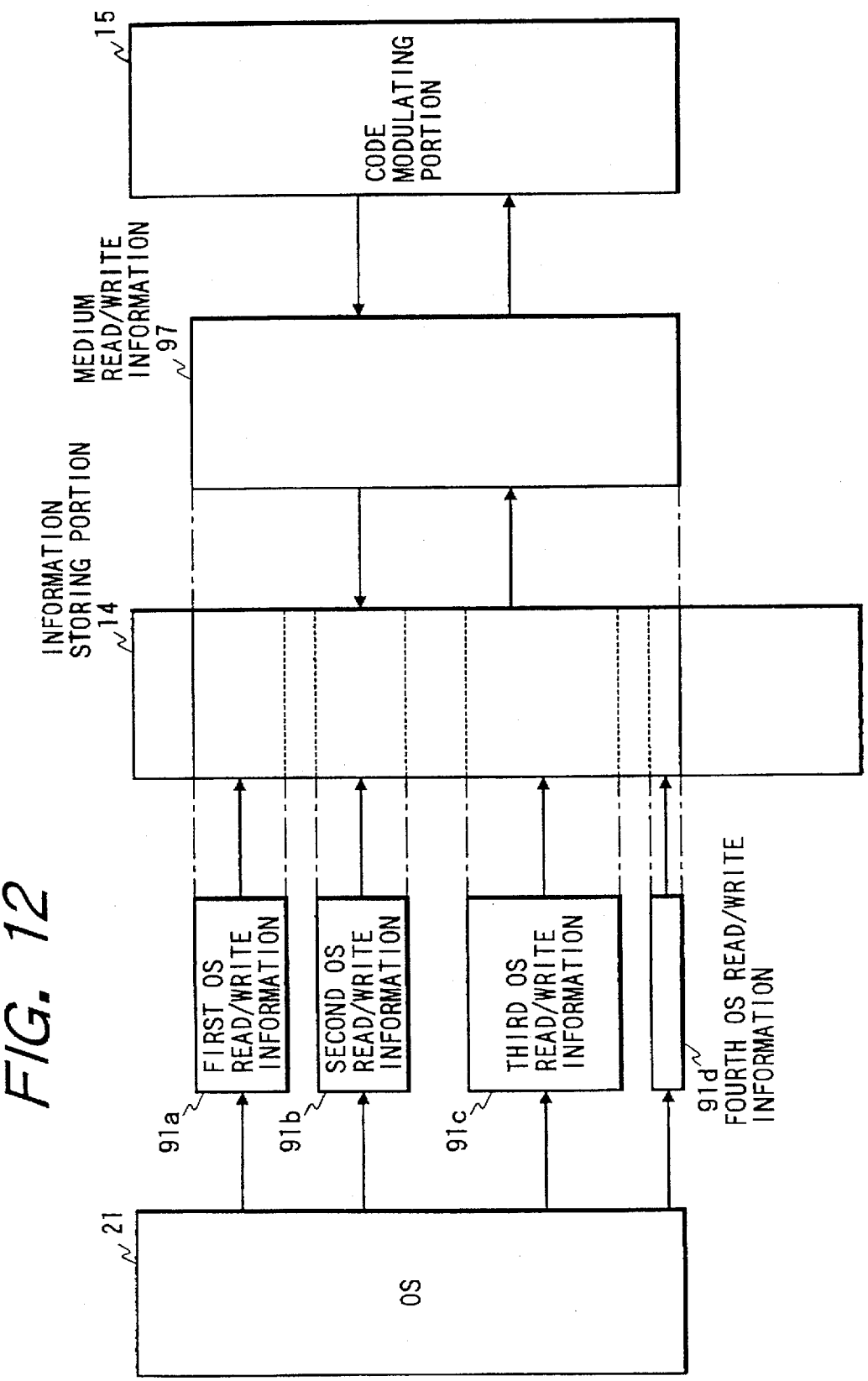

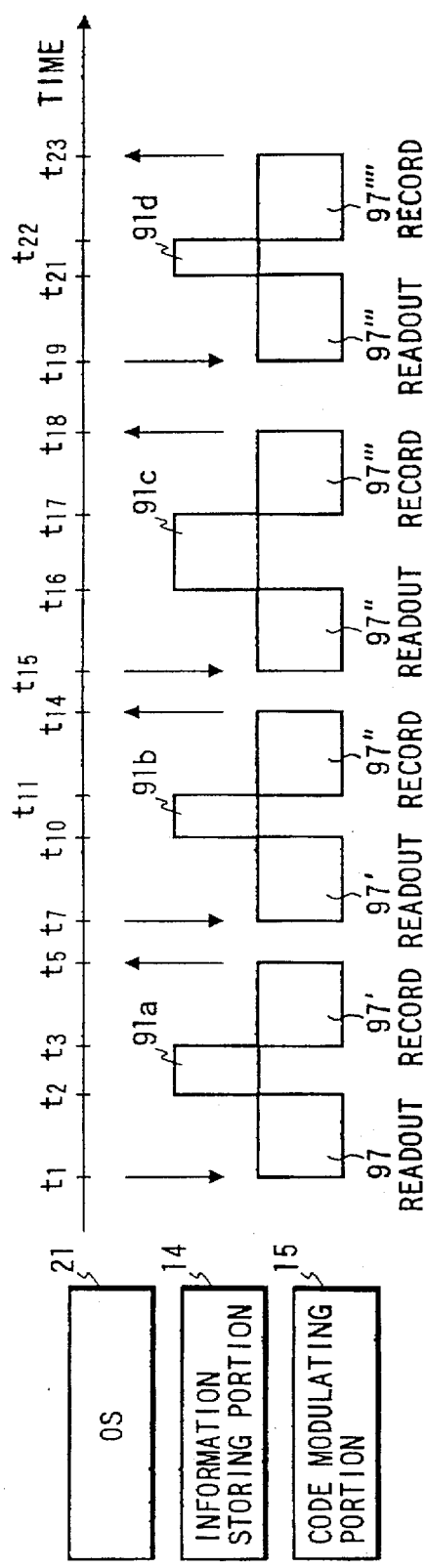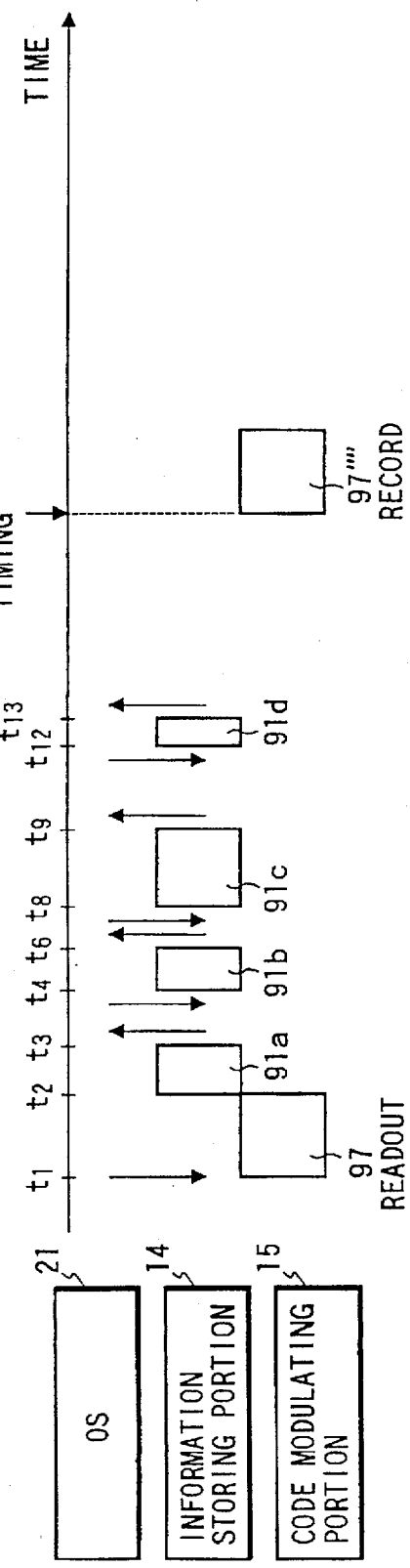
FIG. 13(a)
FIG. 13(b)

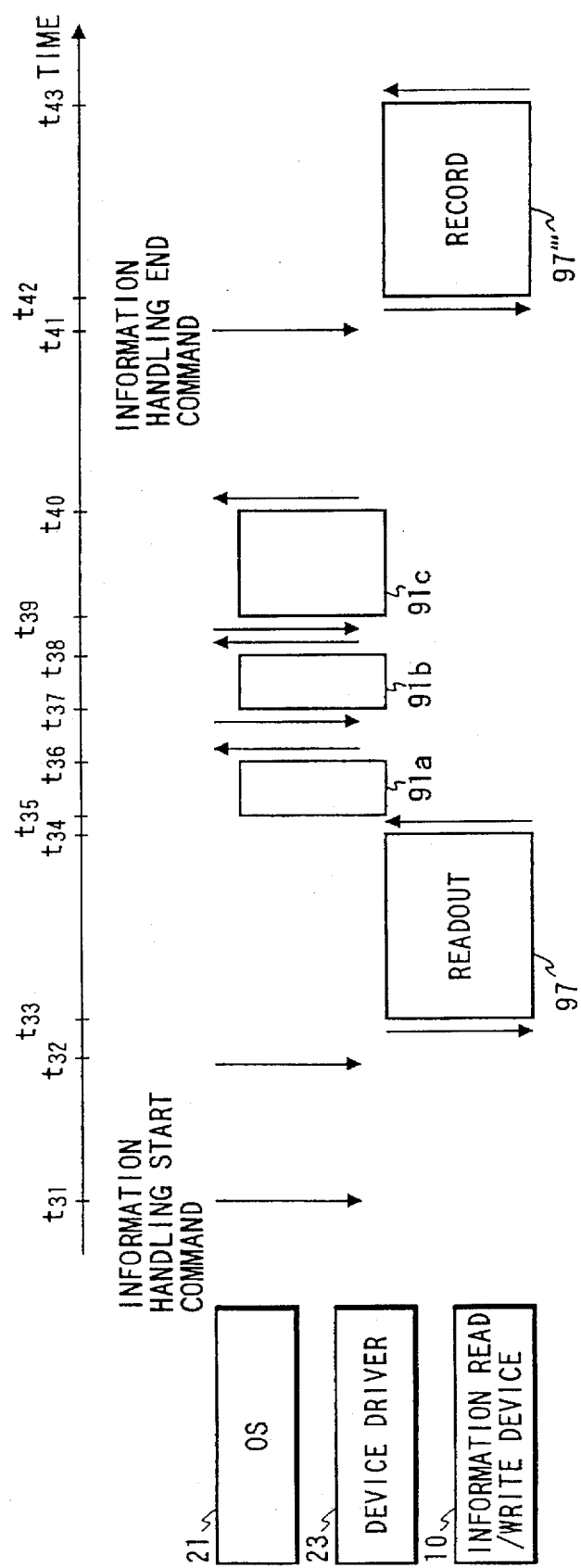

PREPROCESS METHOD, INFORMATION READ/WRITE METHOD, INPUT/OUTPUT DEVICE AND READ/WRITE DEVICE

BACKGROUND OF THE INVENTION

The present invention relates to a method and a device for preprocessing a writable recording medium of a large memory capacity such as an optical disc, and for writing information into and reading information out of the recording medium.

Recently, a CD-ROM (compact disc—read only memory) is widely used as an information read-out device. The CD-ROM, based on the technique of CD-DA (compact disc—digital audio), has advantageous features of large memory capacity and low cost. Because of these features, software suppliers use the CD-ROMs as media most suitable for supplying application programs to a great number of users. The CD-ROM has only the read or reproduction function for users. Accordingly, to record information, another information read/write device must be used. For this reason, great efforts have been made to develop devices capable of recording or writing a great amount of information into and reproducing or reading the information from the disc. There are a CD-WO (compact disc—write once) and a CD-MO (compact disc—magneto optics), standardized under a standard book, called an orange book. The former is of the worm type, and already marketed. The latter is of the rewritable type, and at a stage just before its practical use.

It is a common practice that information is coded in a state that an error correction code is attached to the information before the information is recorded into the recording media, such as CDs. A cross interleaved reed-Solomon code (CIRC), a kind of the error correction code, includes a reed-Solomon code having an excellent ability to correct minute defects (referred to as a random error) of 1 or 2 bits caused in the disc manufacturing stage, and means for converting a burst error to the random error by dispersing, under predetermined rules, data, called interleaved data, having an excellent ability to suppress defects (referred to as a burst error) continuing for a relatively long time, caused by dust, flaws on the disc and by a disturbance in the control device.

A read/write information unit conversion method is disclosed in Unexamined Japanese Patent Publication No. Sho. 63-81661. In this publication, the number of the medium read/write units are selected to be equal to the number of sectors per track (one turn of the recording medium) on the recording medium. With this, a turn wait time present before information is transferred to and from the recording medium is eliminated. And the execution time of the read/write is reduced.

In a conventional read/write device, such as a magnetic disc device, or a magneto-optical disc device, when a recording medium having no information recorded therein is used, the following procedural work is performed. When medium position information is correctly read out of the recording medium, and it is the medium position information that can be predicted on the basis of the previous medium position information, arbitrary information is written into the sector containing the medium position information. Then, the information is read out of the sector. If the information before written is coincident with the read out information, it is judged that the sector is usable. When the read out medium position information contains an error or when the information before written is not coincident with the read out information, it is judged that the sector is defective and unusable. The judgment is registered in the recording medium. In this case, a substitutive sector, in place of the defective sector, is also registered, thereby keeping the continuity in the array of the sectors on the recording medium (This work will be referred to as a "certify"). The "certify" process must be applied to over the entire surface of the recording medium used. Much time is consumed for the "certify" process. This "certify" process must be carried out within a limited time by users, and is an annoying and to-be-avoided work for users.

When the "certify" process is applied to the information read/write device, such as a rewritable CD-MO using the CIRC, and a defect on the recording medium is found, not only the sector containing the defect but also a cluster (a group of sectors, and an information read/write unit in the read/write device) including the defective sector must be removed. Thus, where the large cluster size is used, a remarkable loss of the memory capacity is caused.

The read/write information unit conversion method disclosed in Unexamined Japanese Patent Publication No. Sho. 63-81661 is directed to the recording medium shaped like a disc. The turn wait time can be removed only when a recording medium having a constant number of sectors per one turn is used. In other words, the read/write speed of data can be improved only for such a recording medium. However, in the case of the rewritable CDs, it is desirable to transfer data to and from the recording medium in blocks of the cluster. From the view that the read/write unit of the OS is approximately one sector, this read/write unit difference problem must be solved.

SUMMARY OF THE INVENTION

Accordingly, an object of the present invention is to provide a processing method and a processing device which improve a read/write processing speed for a recording medium of large memory capacity, particularly a rewritable CD, thereby providing a flexible read/write operation. Another object of the present invention is to provide a processing method and a processing device which lessen a load to users by eliminating the "certify" process consuming much time. Yet another object of the present invention is to provide a processing method and a processing device which judge whether or not a sector is usable before data record, and minimizes a loss of the memory capacity of the recording medium. Still another object of the present invention is to provide a processing method and a processing device which can reliably transfer data, even in a small read/write unit used in an OS, for example, to and from a recording medium of a large read/write unit. A further object of the present invention is to provide a processing method and a processing device which are suitable for the read/write operation for a recording medium of the large memory capacity.

In the present invention, in judging whether or not a sector as a unit record area on a readable/writable recording medium is usable, the state of reading the record position information and the medium position information are checked. To be more specific, the following two steps are executed: a step for reading record position information written in a rewritable state into the sector, with a record position of information with an error correction code attached thereto; and a step for reading unprogrammable medium position information, formed in advance on the recording medium, for indicating a position of the sector. Then, it is judged whether or not the sector is usable on the basis of the state of reading the record position information and the state of reading the medium position information. The record position information and other information are written and read out in a state that a high error correction ability code, such as the cross interleaved reed-Solomon code, is attached to the information. Accordingly, if a sector has a minute defect, it is usable in a practical level.

In the step for judging whether or not the sector is usable, it is judged that the sector is unusable when the record position information is abnormally read out, and the medium position information are abnormally read in succession. That is, it is judged that the sector is usable when the record position information is normally read out, and it is judged that the sector is usable when the number of the operations of abnormally reading the medium position information in succession is smaller than an integer $\underline{n}$. On the other hand, it is judged that the sector is unusable when the number of the operations of abnormally reading the medium position information in succession is equal to or larger than an integer $\underline{n}$. The integer $\underline{n}$ satisfies the following inequality (1).

$$\{(\text{defect factor})\div(\text{number of sectors in one cluster})\}<(\text{rate of occurrence of medium position information error})^n \quad (1)$$

In the inequality (1), defect factor=(unusable capacity by defect)/(total record capacity of record medium). The integer $\underline{n}$ is preferably the largest integer of those satisfying the inequality (1).

Such a preprocessing can be carried out at high speed concurrently with reading information from the recording medium. Accordingly, in transferring data to and from the recording medium, it can be judged whether or not a sector is usable whenever occasion calls. Accordingly, there is no need of certifying the recording medium. Further, it is judged depending on a state of a sector just before information is recorded therein. Thus, the preprocessing of the present invention eliminates the "certify" processing for virginal recording media. Further, when information is actually recorded into the recording medium, it can be judged whether or not the sector is usable. Thus, a reliable recording of information into the recording medium is realized.

The preprocessing method of the invention can be executed by an input/output device comprising: a read/write portion for inputting data to and outputting data from a readable/writable recording medium in blocks of the sector as a unit recording area; a code modulating portion for coding and decoding the data; and an operating portion for judging whether or not the sector is usable depending on a state of medium position information indicative of a position of the sector, which is written in advance in the recording medium and unprogrammable and is obtained through the read/write portion, and a state of record position information, which is rewritable into the sector and is obtained through the code modulating portion. When the recording medium is a rewritable optical recording medium, the medium position information is an absolute time in pregroove, and the record position information is any of data within the subcode. The number of the operations of abnormally reading the medium position information in succession is counted by the operating portion. When a count is equal to or larger than the integer $\underline{n}$, it is judged that the sector is unusable.

When data that is scrambled so as to convert a burst error into a random error, is written into and read out of a recording medium, the first read/write unit for the data transfer to and from the recording medium is considerably larger than the second read/write unit of the read/write information of an OS. Accordingly, it is desirable that information is written into and/or read out of the recording medium in blocks of the second read/write unit smaller than the first read/write unit by using an information storing portion capable of temporarily storing information and having the memory capacity at least equal to the first read/write unit. In the information read/write method, when information is read out of the recording medium, the following two steps are executed: a step for reading out of the recording medium first read/write information which consists of the first read/write unit including a record area corresponding to second read/write information consisting of the second read/write unit, in blocks of at least one first read/write unit, and for developing the read out first read/write information into the information storing portion; and a step for reading out of the recording medium the second read/write information of the first read/write information developed into the information storing portion, in blocks of the second read/write unit. When information is written into the recording medium, the information read/write method comprises: the above-mentioned reading steps; a step for replacing the second read/write information with a location corresponding to the first read/write information developed into the information storing portion; and a step for recording the first read/write information of the information storing portion into the recording medium in blocks of the first read/write unit. In this case, the recording step is executed at a given timing after the replacing step is executed several times when information is written into the recording medium. If so done, the number of operations to access the recording medium is reduced, thereby realizing an efficient and high speed processing.

Such a processing is preferably executed by an input/output device comprising: a first input/output portion for transferring first read/write information with at least one first information read/write unit to and from the recording medium; a second input/output portion for transferring second read/write information with at least one second information read/write unit smaller than the first information read/write unit to and from the recording medium; and an information storing portion having the memory capacity at least equal to the first read/write unit and capable of temporarily storing information, the information storing portion preferably allowing the first read/write information to be transferred in blocks of the second read/write unit between the first input/output portion and the second input/output portion. When the input/output device is incorporated into the information read/write device, the first input/output portion serves as a read/write portion for transferring the first read/write information to and from the recording medium, and the second input/output portion serves as a communication portion for inputting and outputting the second read/write information through a bus. Further, if a code modulating portion for coding and decoding information, from the information storing portion, to be inputted to and outputted from the first input/output portion, is further included, a reliability of the input/output information is further improved. For example, information can be coded by the cross interleaved reed-Solomon code, and decoded.

When the input/output device is provided in an information processor, such as a host computer, an external storage device containing the recording medium is used through the input/output device, the first input/output portion allows first read/write information to be inputted thereto and outputted therefrom through a bus, and the second input/output portion transfers the second read/write information to and from an operating system. In many computers, the first and second input/output portions may be realized in the form of a device driver operating under control of an operating system (OS).

If the first input/output portion outputs the first read/write information at a given timing, the access to the recording medium is efficiently done, improving a processing speed. An information handling end command of an operating system or a command to eject the recording medium may be used as the given timing.

BRIEF DESCRIPTION OF THE DRAWINGS

FIG. 1 is a block diagram schematically showing an information read/write device and a host computer thereof, which are constructed on the basis of the present invention, FIGS. 2(a) to 2(f) are diagrams showing the data structure of data handled in the information read/write device and the host computer shown in FIG. 1 in which FIG. 2(a) shows an allocation of physical clusters on an information recording medium; FIG. 2(b) shows an array of data in the physical cluster; FIG. 2(c) shows an array of data in a sector; FIG. 2(d) shows an array of data in an EFM frame; FIG. 2(e) shows an array of data in a subcode; and FIG. 2(f) shows the contents of subcode data, FIGS. 3(a) to 3(d) are diagrams showing how data are scrambled when it is written into and read out of an information recording medium, FIG. 8 is a flowchart showing a flow of a processing for reading and writing the information different in read/write units by the information storing portion, FIG. 12 is a diagram showing flows of information in writing and reading the information of different read/write units by the information storing portion, FIGS. 13(a) and 13(b) are timing diagrams showing the operation of writing information into and reading the same out of the recording medium by the information read/write device, in which FIG. 13(a) shows the operation when an ex post facto recording method is not used, and FIG. 13(b) shows the operation when the ex post facto recording method is used, and FIG. 14 is a timing diagram showing the input/output operation when information is written and read out.

DETAILED DESCRIPTION OF THE PREFERRED EMBODIMENTS

Figure 4:
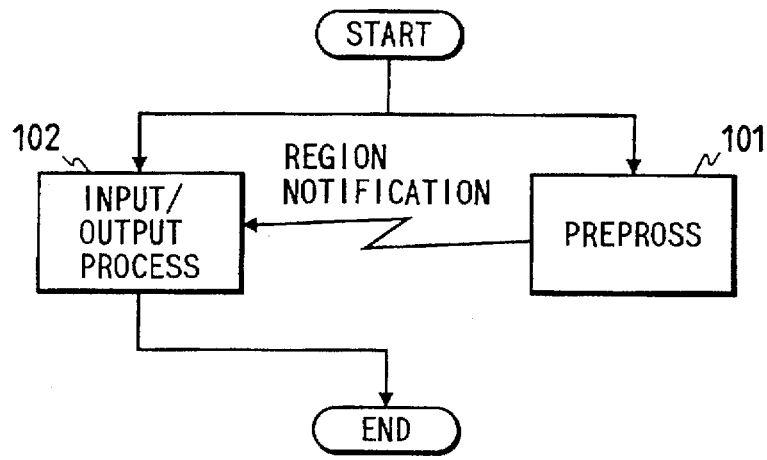
FIG. 4 is a flowchart showing a processing carried out in the information read/write device shown in FIG. 1.

A write/read device using a rewritable CD as an information recording or storing medium and a computer using the read/write device as an external input/output device thereof will be described for explaining the present invention.

Device Outline

FIG. 1 shows an outline of the combination of an information read/write device 10 and a host computer 20. The information read/write device 10 includes an input/output section 12, which accepts a CD as an information recording or storing medium 11, for inputting and outputting data to and from the information recording medium 11, and a medium control mechanism 19 for controlling a rotation of the recording medium 11 and the operation of positioning an optical head. The host computer 20 contains an operating system (OS) 21 for operating the computer, a device driver 23 which receives data from the OS 21 and sends data to the information read/write device 10, to thereby to be able to control the information read/write device 10, a memory 22, such as a RAM, and an application 24 operating on the basis of the OS 21. The host computer 20 further includes a timer 25 with a clock function. The device driver 23, the timer 25, and a device/driver information storing part 26 as a part of the memory 22 make up an input/output control portion 27 of the computer. The device driver used for the input/output generally functions as a buffer for the interaction between the file handled by the OS and the file handled by the information read/write device. It is a common practice that the specification of the device driver, when it is used, is different for each information read/write device.

The host computer 20 and the information read/write device 10 are connected by means of a bus 30, for example, SCSI. The host computer 20 and the information read/write device 10 are provided with bus interfaces 19 and 29, respectively. Data and control instructions are transferred between the host computer and the information read/write device, through these interfaces. The input/output section 12 contained in the information read/write device 10 includes a communication portion 13 which receives data through the medium control mechanism 19 from the computer and sends data to the computer, a device information storing portion 14 for temporarily storing data transferred through the communication portion 13, a code modulating portion 15 for coding and decoding the data transferred to and from the computer into the data transferred to and from the recording medium, a read/write portion 16 for writing the coded data into and read the same from the recording medium 11, an operating portion 17 for determining the results of the certify, and a control portion 18 for controlling those portions.

To write data into the recording medium, the following procedure is taken in the input/output section 12. Beforecode-modulation data, which is edited or formed through the communication with the computer and stored in the device information storing portion 14, is coded and modulated into coded data using CIRC by the code modulating portion 15, the coded data are converted into read/write data through the read/write portion 16, and the read/write data are stored into the recording medium 11. To read data out of the recording medium, the reverse procedure is taken. The read/write data are read out of the recording medium 11, restored to the coded data through the read/write portion 16, the coded data are modulated and coded into the before-code-modulation data by the code modulating portion 15, and the result is sent to the host computer 20.

Data Structure

The structure of the read/write data to be written into and read out of the recording medium 11 will be described with reference to FIGS. 2(a) to 2(f). As shown in FIG. 2(a), a memory area of the recording medium 11 is segmented into a plural number of segmental areas each having the unit of a cluster 61. In the recording medium 11, one cluster 61, inclusive of additional information described later, has the data size of 76K bytes. The clusters to be inputted to and outputted from the recording medium will be referred to as "physical clusters". As shown in FIG. 2(b), one physical cluster 61 contains a logical cluster 70 of 64K bytes, which consists of a plural number of sectors 71, before-data additional information 62 located preceding to the logical cluster 70, and after-data additional information 63 located succeeding to the logical cluster 70. The before-data additional information 62 consists of a Link1 sector 64, a RunIn1 sector 65, and a RunIn2 sector 66. The after-data additional information 63 consists of a RunOut1 sector 67, a RunOut2 sector 68, and a Link2 sector 69. The input/output section 12 stores the plural number of sectors 71 in the logical cluster 70 into the recording medium 11 by using read/write data, which is dispersed and arrayed (scrambled) in the memory area of two successive sectors. For this reason, the sectors for the scramble must be located before and after the logical cluster 70, and the physical cluster 61 including the RunIn1 sector 65, RunIn2 sector 66, RunOut1 sector 67, and RunOut2 sector 68 is used to perform input and output. The physical cluster 61 further includes the Link1 sector 64 and the Link2 sector 69 that are located before and after the cluster, in order to absorb a nonuniformity of the rotation speed of the recording medium 11 and a variation of the sector positions caused by jitter of the read/write portion.

FIGS. 3(a) to 3(d) show diagrams showing how to scramble the information in the form of sectors. Assuming that one sector before the scramble is carried out, consists of 2352 bytes, the whole data before the scramble are arranged in the order of sectors m, m+1, m+2, m+3, ... (see FIG. 3(a). When the data are scrambled, the data of the sector m is dispersed into sectors m, m+1 and m+2 (see FIG. 3(b)). The data of the sector m+1 is dispersed into sectors m+1, m+2 and m+3 (see FIG. 3(c)). As a result, the sector m after the scramble contains data located at a position in the three sectors m, m−1 and m−2 of the whole data before the scramble (see FIG. 3(d)). The remaining sectors are scrambled in similar ways. As the result of scrambling the data in the sector, if a burst error extending over the sector is caused, all the information of the sector are not lost and there is a possibility that the error is removed by using the CIRC, for example. Therefore, a reliability of data to be written into and read out of the recording medium is remarkably improved.

The inputting and outputting of the scrambled and recorded data to and from the recording medium is incomplete when only a sector of the scrambled data is inputted and outputted. To make the input and output of the scrambled data, the sector and the sectors before and after the sector as well must be inputted and outputted. The same thing is true for the sectors located at the ends of the logical cluster 70. To scramble the data at the ends of the logical cluster 70, the RunIn1 sector 65 and the RunIn2 sector 66, and the RunOut1 sector 67 and the RunOut2 sector 68 are required. Thus, the scramble technique can secure a reliability of data. A sector contains the information of the sectors before and after the sector. Accordingly, when a sector to be read out of the recording medium is a sector m, three sectors including the data of the sector m (i.e., sector m, sector m+1 and sector m+2) must be read out. Similarly, when a sector to be written is a sector m, three sectors including the data of the sector m (i.e., sector m, sector m+1 and sector m+2) must be written into the recording medium. As described above, the information of the sectors m−2, m−1 and m must be written for the sector m, and the information of the sectors m−1, m and m+1, for the sector m+1. Accordingly, in writing and reading data to and from the recording medium 11, one sector as referred to above is handled as a data write unit or block, and it is desirable to write and read data in blocks of the data write unit.

Returning to FIG. 2, the logical cluster 70 consists of a plural number of sectors 71. The sector 71 consists of 98 number of EFM frames 72, as shown in FIG. 2(c). Here, EFM is the abbreviation of eight to fourteen modulation (8–14 modulation), which is one of various modulations. In the EFM, data of 8 bits is converted into a data pattern of 14 bits. One group (EFM frame) 72 of the information modulated by the EFM, as shown in FIG. 2(d), consists of a synchronizing signal 73 used for sampling, and a subcode 74, and a series of data 75 with parities 76 following the subcode. A group of 98 number of EFM frames 72 is handled as one unit (98 EFM frames). This constitutes one sector.

When the subcodes 74 of 98 number of the EFM frames 72 are combined, the whole subcode having the structure as shown in FIG. 2(e) is constructed. The subcode 74 consists of a control bit 75, an address bit 76, subcode data 77, and a CRC (cyclic redundancy check code; a cyclic code for detecting an error of the subcode data) 78. The subcode data 77, as shown in FIG. 2(f), consists of a track number 79, an index 80, a current position 81 in a track, 0 data 82, and an absolute position 83. An error detection of the subcode data 77 is performed by the CRC 78. Since the subcode data are dispersed into 98 number of the sectors 71, it can reliably be read out unless a considerably large burst error is caused.

Processing by Information Read/Write Device

FIG. 4 is a diagram showing processes executed by the information read/write device 10. At the time of writing data and reading data out of the recording medium, the information read/write device 10 executes a preprocess 101 and an input/output process 102 for writing data into and reading data out of the recording medium, and for reprogramming data stored in the recording medium.

Preprocess

This process eliminates the "certify", which is used in the information read/write device, such as a magnetic disk device and a magneto-optical disc. The conventional device carries out a process, called "certify". This process checks a virgin recording medium every sector as to if it is normal in the information read/write capability before information is first written into the recording medium. More exactly, in the certify process, it is read out medium position information on the recording medium, and is judged if the medium position information can exactly be read out, and if it can be predicted on the previous medium position information. Next, arbitrary information is written into the sector containing the medium position information, and the same is read out of the sector. When the written information is coincident with the read out information, it is determined that the sector is normal in the read/write capability. When the medium position information contains a read out error and/or when the written information is not coincident with the read out information, it is determined that the sector is defective. In this case, the defective sector is registered as a defective area in the recording medium, and at the same time, another sector in place of defective sector is registered. With this registering operation, the continuity of the sectors can be secured in the read/write of data even if the recording medium contains detective sectors. The "certify" process consumes much time since it must be applied to the entire surface of the recording medium used. When the "certify" process finds a defective sector on the recording medium, the defective sector and the whole cluster containing the defective sector as well must be removed. Therefore, where the cluster size is large, if a defective sector is found, the memory capacity of the recording medium is remarkably reduced.

In the present embodiment, the information read/write device 10 shown in FIG. 1 concurrently carries out the preprocess 101 for finding defective sectors and the input/output process 102, as shown in FIG. 4. Accordingly, there is no need of the "certify" process. One can load a virgin recording medium into the information read/write device, and immediately write information into and read the same out of the recording medium. In order that the defective finding process may be carried out concurrently with the input/output process, the preprocess in the present embodiment is arranged such that the check of the defective sector is made on the basis of the presence or absence of record position information and a rate of an occurrence of a read-out error of the medium position information, whereby a state of the recording medium can be grasped reliably and for a short time. To be more specific, the input/output section 12 of the information read/write device 10 forcibly reads data from the recording medium 11 through the read/write portion 16, and decodes the data by the code modulating portion 15. It is determined whether or not the record position information is present on the basis of any of the information indicative of the record position in the decoded subcode data 77. As described above, the subcode data 77 is dispersed into 98 number of the EFM frames, and the CRC is used for error detection. Therefore, the data can reliably be read out unless a considerably large burst error is caused. Since the data are necessarily contained in the EFM frames, if the memory area under check contains this record position information, it is determined that it is a memory area where information has already been stored, and the memory area may be used for the read/write of information. In the input/output section 12 of the present embodiment, the operating portion 17 uses the absolute position 83 of the subcode data for determining the presence or absence of the record position information. If required, another position information, such as the track number 79 or the current position 81 in the track, may be used for the same purpose. Any other modulation than the EFM data may be used as a matter of course, and it is possible to check as to if the record position information is present or absent by using position information comparable with the subcode data.

Figure 5:
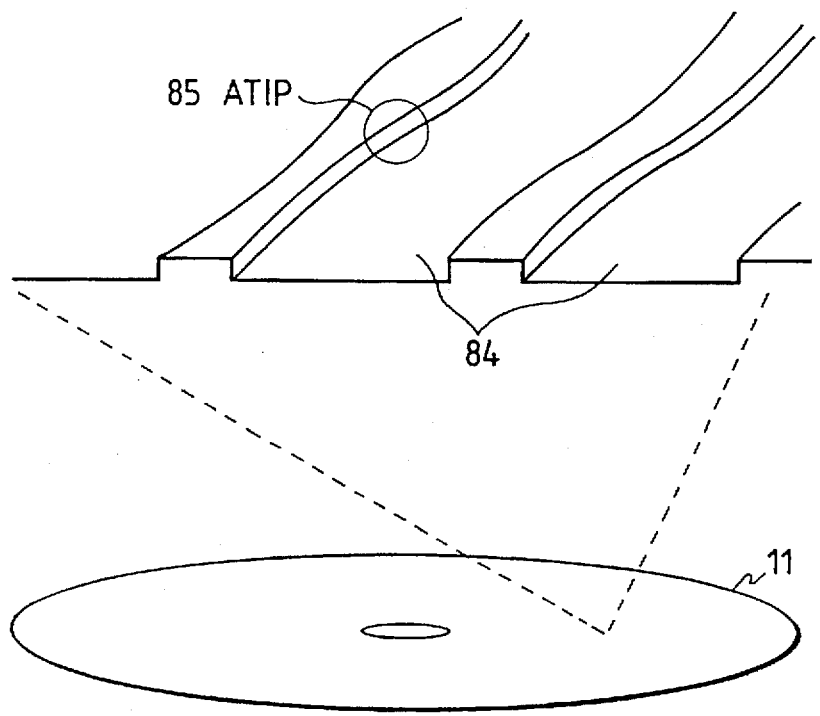
FIG. 5 is an explanatory diagram for explaining medium position information on an information recording medium.

The medium position information is directly provided in the recording medium in order to indicate the current positions on the recording medium. In the present invention, an absolute time in pregroove (ATIP) in a pregroove shown in FIG. 5 is used for the medium position information. This information is separated by the read/write portion 16 which directly receives data from the recording medium 11, and supplied to the operating portion 17. The term "pregroove" means grooves 84, shaped like guide rails, previously cut in the surface of the recording medium 11. Information indicative of the positions of the grooves 84 on the recording medium 11 are written in the form of ATIP 85 in the grooves 84 during the processing of manufacturing the recording medium 11. No error correction is made on the ATIP 85. Therefore, the burst error, if present, leads to an error of information read out of the recording medium. One ATIP is recorded for one sector. While in this embodiment, the ATIP 85 is used for the medium position information, any other means than the ATIP 85, if it is previously written in the recording medium, may be used for the same purpose. Further, it is evident that the recording medium applicable to the present invention is not limited to the circular recording medium shown in FIG. 5.

Before proceeding with description of the methods of operating the record position information and the medium position information, the relationship between the record position information and the medium position information will be described with reference to the following table.

TABLE 1

| | | read state | | | |
|---|---|---|---|---|---|
| | | absolute position | record position | compa. of judgement | |
| state of medium | | infor. (ATIP) | infor. (subcode) | present invention | certify |
| recorded | | normal | normal | information is readable | information is readable |
| | minute fault | error occurs | normal | information is readable | information is readable |
| | large fault | error occurs | error occurs | information is not readable | information is not readable |
| not recorded | | normal | error occurs | information is readable | information is readable |
| | minute fault | error occurs | error occurs | save | information is not readable |
| | large fault | error occurs | error occurs | information is not readable | information is not readable |

In preparing Table 1, two types of the recording media, one having information recorded or stored therein and the other having no information recorded or stored therein were used. The medium position information (ATIP) and the record position information (subcode) were written into these recording media. In the table, the states of writing information into the media and evaluations on the results of the writing by the present invention and by the "certify" process executed in the conventional information read/write device are comparatively tabulated.

In a case where the preprocessing is applied to the recording medium having information stored therein in the information read/write device of the present embodiment, when a read error occurs in both the medium position information and the record position information, it is judged that information of the sector cannot be corrected and hence use of the sector is prohibited. When neither the medium position information or the record position information can be read out, it is judged that after information is stored, the recording medium has flaws formed in and dust attached to the surface thereof after information is stored or recorded therein, and as a result, a large defect exists in the recording medium. In this case, there is no assurance that when data are written thereinto, the written data can be read out in a normal state. The same thing is true for the "certify" processing when it is applied to the recording medium in the conventional information read/write device. In a case where the medium position information, when read out, contains an error, but the record position information, when read out, contains no error, a minute defect is present in the recording medium, but the stored data are normally read out. In this case, the preprocessing of the present embodiment and the conventional "certify" processing certify that it can be used for the read/write of data.

When the preprocess of the information read/write device in the present embodiment is applied to the recording medium having no information written thereinto, a read error is contained in the read out record position information since the recording medium has no information written thereinto. Therefore, the recording medium having the medium position information written thereinto is used for checking it for the read/write of data. When the medium position information is incorrectly read out of a sector, the "certify" processing simply judges that a sector cannot be used for the read/write of data. In this case, as already referred to, not only the sector suffering from a defect but also the whole cluster including the defective sector must be removed. In a recording medium having a high rate of occurrence of medium position information error, which will be described later, a read error of the medium position information frequently occurs. Accordingly, in this recording medium, a memory area, which is judged to be a read/write impossible area, is extremely large.

On the other hand, in the information read/write device of the present embodiment, only when a read error of the medium position information successively occurs a preset number of times in a sector on the recording medium, it is judge that the sector is unusable. With such a judgement, sectors containing minute defects are allowed to be used for the read/write of data. As seen from the judgement on the recording medium having information stored therein, the error correction ability of the record position information is considerably high. Further, the error correction is likewise applied to other data stored in the recording medium. Actually, it is possible to write data into the sector. Thus, the sectors containing minute defects are allowed to be used for the read/write of data. Further, the preprocess of the present embodiment specifies the sector suffering from an instable read/write of data, viz., the sector that may have a large defect, on the basis of the fact that a read error successively occurs in the medium position information. Also in the preprocess of the present embodiment, it is judged that such a sector, together with the cluster including the sector, is unusable, and another cluster is substituted for the cluster containing the defective sector.

That is, the preprocess of the embodiment determines whether a sector is usable or unusable on the basis of the number of successive failures of reading the medium position information out of the sector of the recording medium. The number $n$ (n: integer) of successive read failures is defined by the following inequality (1).

$$\{(\text{defect factor}) \div (\text{number of sectors in one cluster})\} < (\text{rate of occurrence of medium position information error})^n \quad (1)$$

In the above inequality, the defect factor is a ratio of a memory capacity that can actually be used, viz., except the memory capacity lost by a defect, to the whole memory capacity of a recording medium. In the present embodiment, the defect factor is a ratio of unusable clusters to usable clusters on the recording medium since data are written and read out every cluster. Incidentally, even if only one defective sector is contained in a cluster, the defective-sector contained cluster is unusable. Usually, a media supplier determines the specifications of recording media. Accordingly, a defect factor specified by the media supplier may be used.

The error occurrence rate of the medium position information is a ratio of the number of sectors in which a read error of the medium position information probably occurs, to the total number of the sectors on the recording medium. In this embodiment, the error occurrence rate is that of ATIP since ATIP is used for the medium position information, and is approximately 0.1.

The inequality (1) is derived from the following basic idea. The defective sector is a memory area having large flaw or various flaws gathered therein. Because of this, the medium position information containing errors are successively read out of such a memory area. As a consequence, the number of successive read errors of the medium position information can be used for judging as to whether a sector is usable or unusable.

The left side of the inequality (1) is the division of a defect factor by the number of sectors in one cluster, and hence describes a probability of the presence of defective sectors. The right side of the inequality (1) describes a probability that a read error of the medium position information successively occurs $n$ times. Since the right side is larger than the left side in the inequality, if a sector in which medium position information causes successively the read out error $n$ times, is recognized as a defective sector, the defective sector on the recording medium can be recognized without failure.

It is most preferable to select the maximum value of those of $n$ which satisfy the inequality (1) for the integer $n$. By so doing, a maximum memory area that can be used by a user is secured. Further, since the right side is larger than the left side in the inequality (1), there is prevented such an unwanted situation that a defect in a sector of the recording medium grows by oxidation with time to have a defect size large enough to damage the sector to such an extent that the sector cannot be used for the read/write of data. In other words, in the preprocess of the present embodiment, judgement as to whether or not a sector is defective is made at an early stage. It is evident that the maximum value of $n$ satisfying the inequality (1) may be substituted by $n$ of which the value is smaller than the maximum value. The value of $n$ may be determined in consideration with a durability of the recording medium and ambient conditions where it is used.

The integer $n$ for different numbers of sectors in one cluster and defect factors is shown in Table 2.

TABLE 2

| defect factor | | number of sectors in one cluster | | | |
|---|---|---|---|---|---|
| | | 4 | 8 | 16 | 32 |
| 10% | 64 MB | 1 | 1 | 2 | 2 |
| 5% | 32 MB | 1 | 2 | 2 | 2 |
| 1% | 6.4 MB | 2 | 2 | 3 | 3 |
| 0.5% | 3.2 MB | 2 | 3 | 3 | 3 |
| 0.1% | 0.6 MB | 3 | 3 | 4 | 4 | defect capacity when total capacity of the recording medium is 640 MB

For ease of explanation, Table 2 shows some specific values for several sectors in one cluster and defect factors. However, $n$ can be calculated for other values. In an example where the number of sectors in one cluster=32 and the defect factor=1%, defect sector existence probability=$3.125 \times 10^{-4}$. This value is smaller than a probability that a read error of the medium position information successively occurs three times=$1 \times 10^{-3}$. Accordingly, if n=3, it exceeds an existence probability of the defective sector on the recording medium. Hence, the present invention can realize a defective sector discriminating method of extremely high reliability.

Figure 6:
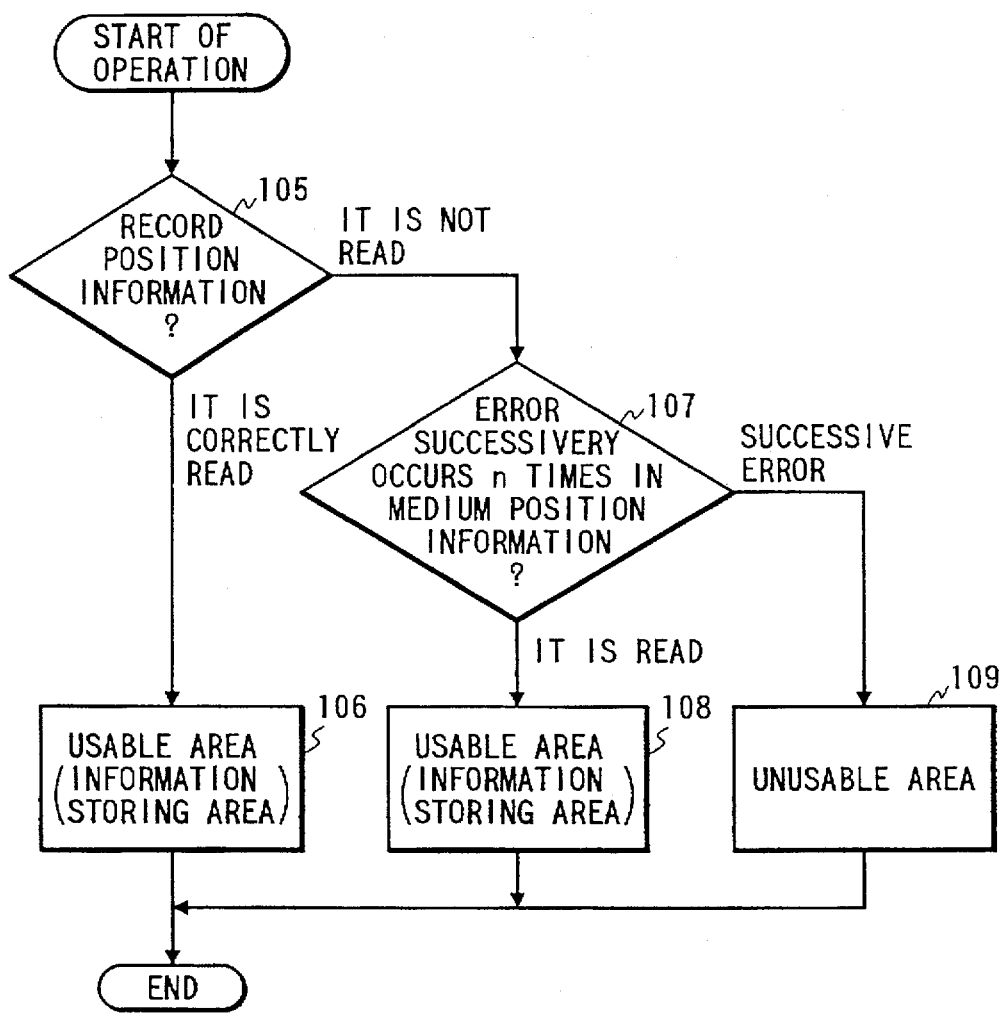
FIG. 6 is a flowchart showing a flow of preprocessing in the information read/write device shown in FIG. 1.

A process carried out in the operating portion 17 is illustrated in the form of a flowchart in FIG. 6. In a step 105, it is determined whether or not an error is present in reading of the record position information (subcode) of an intended sector. If the record position information (subcode) is correctly read out, it is determined, in a step 106, that the sector is a usable area (information storing area). If it is determined in the step 105 that an error is present in reading of the record position information (subcode) of an intended sector, it is determined, in a step 107, whether or not an error successively occurs n times or more in the medium position information (ATIP) to be accessed for read. If the number of successive errors is (n−1) or smaller, it is determined, in a step 108, that data are not yet recorded in the sector to be accessed for read, but the sector is a usable area (memory area having never had information written thereinto). If it is determined, in the step 107, that an error successively occurs n times or more in the medium position information (ATIP) to be accessed for read, it is determined, in a step 109, that the sector is defective and unusable. The above-mentioned processing flow in the operating portion 17 may be realized by a software technique or a hardware technique.

In the preprocess in the present embodiment, the judgements of the steps 107, 108 and 109 indicate the states of the sector being accessed. These judgements are each sent in the form of an area message to the input/output process 102. In response to the message, in the input/output process 102, information is read from the sector or information is written into the sector or a substitutive sector if the sector is defective.

In the information read/write device, as of the present embodiment, which employs the data structure capable of dealing with some measure of burst error, such as the code of high error correction ability, such as CIRC, and the scramble, judgement on the defective sectors of the recording medium can easily be made by the preprocess as described above. In the preprocess, there is no need of repeating the read/write operation, whereas in the conventional "certify" process, the read/write operation must be repeated. In this respect, time saving is realized for users. Further, the preprocess in the present embodiment removes the defective sectors, to thereby secure a reliability of the read/write of data while minimizing the number of the sectors rendered unusable. Reduction of the memory capacity by the preprocess is less than that by the "certify" process. Thus, the present invention succeeds in providing an information read/write device of high reliability.

In the present embodiment, even if the sector to be accessed is a sector having no information recorded therein, data can be written into and read out of that sector. The reason for this is that a read or reproduction clock signal is generated from the ATIP.

Input/Output Process

Data from the host computer 20 is written into the recording medium 11 having undergone the preprocess as described above by the input/output section 12 of the information read/write device 10 in the present embodiment. Further, the written data are read out by the input/output section. In the host computer 20, the application 24 transfers data to and receives data from the information read/write device 10, through the OS 21 and the input/output control portion 27 including the device driver 23. In the host computer 20, the application 24b directly transfers data to and receives data from the information read/write device 10 through the interfaces, not through the OS 21, viz., the input/output control portion 27.

Input/Output Process in the Information Read/Write Device

In the input/output section 12 of the information read/write device in the present embodiment, data from the host computer to be written or recorded into the recording medium 11 is received by the communication portion 13, and temporarily stored in the device information storing portion 14 while leaving the data format unchanged. The data stored in the device information storing portion 14 is transferred as before-code-modulation data to the code modulating portion 15. In turn, the code modulating portion 15 codes and modulates the data into coded data using the CICR. The coded data are converted into scrambled read/write data through the read/write portion 16, and then is written into the recording medium 11. In a data reproduction or read mode, the reverse procedure is taken. The read/write data read out of the recording medium 11 is scrambled into the coded data in the read/write portion 16. The coded data are modulated and decoded into before-code-modulation data which is accepted by the computer, in the code modulating portion 15. The result is temporarily stored in the device information storing portion 14. The data stored in the device information storing portion 14 is then transferred through the communication portion 13 to the host computer, such as a computer.

Through such an input/output path, the CIRC is attached as an error correction code to the data, and the scramble is applied to the data. A high reliability of the bit error rate of $10^{-12}$ can be gained as in other computer devices. In writing the data from the read/write portion 16 into and reading the data out of the recording medium 11 into the read/write portion 16, it is desirable to handle the data in blocks of cluster. For example, when data are actually written enbloc into the recording medium 11, the data to be written enbloc must continuously be written into the recording medium in synchronism with the recording medium. Accordingly, the following inequality (2) must hold.

(transfer rate from host computer to communicatin portion)>(recording rate to recording medium) (2)

The transfer rate (time required for transferring data of a preset length) of data from the host computer depends largely on assignment of jobs, for example, in the host computer. The transfer rate as defined by the inequality (2) does not always satisfy every situation when data are recorded in the information read/write device. For this reason, in the information read/write device 10, the device information storing portion 14 capable of temporarily storing data to be recorded enbloc, viz., at least the data of one cluster, is used in the input/output section 12.

In the information read/write device 10 in the present embodiment, the device information storing portion 14 of a large memory capacity is used in the input/output section 12. The information read/write device 10 receives from the host computer the data of one cluster as a data write unit for the transfer of data when it is written into the recording medium 11 by the device information storing portion 14. After the receiving operation of the data is completed, the information read/write device 10 starts the writing operation of the data into the recording medium 11. With provision of the device information storing portion 14, the data stored in the recording medium 11 can be rewritten independently of the transfer rate of the host computer. Accordingly, a stable information read/write device is realized.

The device information storing portion 14 may have a memory capacity of two clusters or larger. Where the device information storing portion 14 of two clusters or larger is used, when data of larger than one cluster is recorded, an apparent transfer rate when viewed from the host computer is further improved. When the device information storing portion 14 of four clusters in memory capacity, for example, is used, the device information storing portion 14 receives the data up to four clusters from the host computer and stores the data therein independently of a write execution time taken when the read/write portion 16 actually writes data into the recording medium 11. When the device information storing portion 14 receives data from the host computer, a message describing that the writing of data into the recording medium is completed may be sent to the host computer. With this, data transfer between the host computer and the communication portion is completed, the OS 21 or the device driver 23, or the application 26b is released from the data transfer processing. Then, the computer may immediately start to carry out the next job. With provision of the device information storing portion of a memory capacity larger than the data write unit for the data transfer in writing data into the recording medium 11, the information read/write device is capable of transferring data to and from the computer at high speed.

A reprogrammable memory, such as a RAM, is most suitable for the device information storing portion 14. If required, any other reprogrammable data storing media may be used for the same.

Sector Rewriting Method

Figure 7:
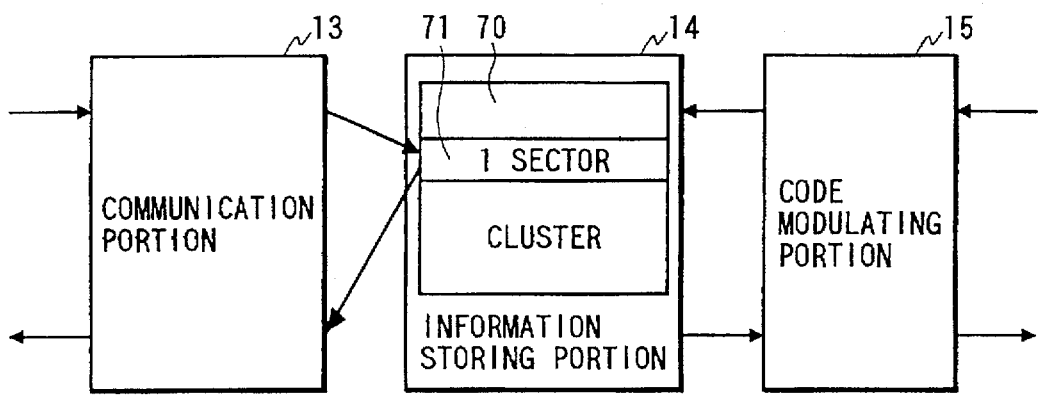
FIG. 7 is a diagram showing how a read/write unit of data is converted by using an information storing portion.

A rewriting process of sectors will be described with reference to the data structure shown in FIGS. 2(a) to 2(f) and the relationship between the sectors and the logic cluster in the device information storing portion 14 shown in FIG. 7. The sector rewriting processing is carried out where the cluster is transferred in blocks of the data write unit. The processing flow is shown in FIG. 8. It is assumed that the first sector of all the information in the k-th physical cluster 61 on the recording medium 11, viz., the logical cluster 70, is a (k, 1) sector 71. To write information into the (k, 1) sector 71, in a step 110, data are read out in blocks of the physical cluster 61 from the recording medium, and all the information of the logic cluster substantially constituting the data in the physical cluster 61 are loaded into the device information storing portion 14. In the next step 112, the communication portion 13 receives the data of a (k, 1) sector to be recorded from the host computer in blocks of a data unit for the data transfer when the computer outputs data, e.g., a data unit of a sector. In a step 115, the data of the (k, 1) sector, which is received by the communication portion 13, is developed into one sector in the device information storing portion 14. In a step 116, the information of the whole logic cluster including one rewritten sector, which contain additional information attached to the head and the tail of the information, is written into the recording medium 11. In this case, the information is written every physical cluster 61. To reproduce or read out the (k, 1) sector 71, in the steps 110 and 112, all the information of one cluster are read out of the recording medium. In a step 113, the execution of reading out (k, 1) sector 71 is recognized. In a step 117, the information of the (k, 1) sector 71 is read out of the device information storing portion 14, and sent through the communication portion 13 to the host computer 20 in blocks of the data unit for the data transfer in the computer, e.g., every sector.

In the input/output process as of the present embodiment, no problem arises even if the read/write unit for the data transfer to and from the recording medium is different from that for the data transfer from the host computer. Accordingly, in the device based on the input/output process, the information read/write device is operable while being compatible with any of the host computers of different read/write units. As described above, the device information storing portion 14 serves as a useful storage portion when data are inputted to and outputted from the recording medium 11. With provision of the device information storing portion 14 which allows data to be inputted thereto and outputted therefrom in blocks of the read/write unit for the data transfer to and from the recording medium, data can quickly be inputted to and outputted from such a recording medium based on the scrambled recording device, which is insensitive to the burst error. Further, normal read/write of data is ensured also in such a case where the read/write unit for the data transfer to and from the recording medium is different from that for the data from the host computer. Further, the device information storing portion 14 has a multiple of functions, as mentioned above. This contributes to cost reduction of the information read/write device.

Figure 9:
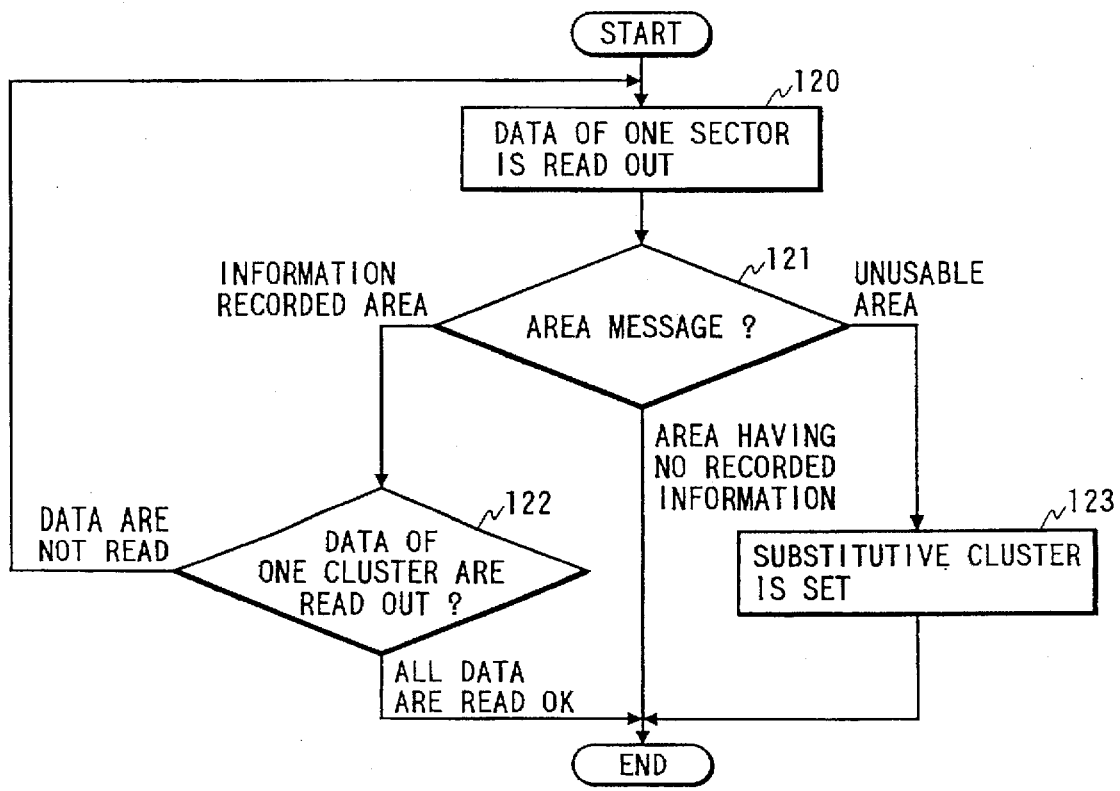
FIG. 9 is a flowchart showing how an area message generated in the preprocessing is processed in a data read mode in the input/output processing of FIG. 8.

How an area message generated in the preprocess is used in the input/output process is illustrated in the form of a flowchart in FIG. 9. The process of the step 110 to read data every cluster as shown in FIG. 8 will be described for more detail. To start, in a step 120, data of one sector is detected and read out. More exactly, data are detected and read out every 2 kilo bytes. In this case, the preprocess, which is described in connection with the flowchart of FIG. 6, determines whether the sector is usable or unusable, and the result of the determination is sent as an area message. In a step 121, if the area message states that the sector is an information recorded area (based on the judgement in the step 106), control returns to the step 120 and repeats the process till data of one cluster is read out in a step 122. If the area message states that the sector is a virginal area having no information recorded therein (based on the judgement in the step 108), the sector is a usable area. Control flows to a downstream process for rewriting or writing anew data into the section. If the area message states that the sector is an unusable area (based on the judgement in the step 109), a substitutive cluster is set in a step 123, and the process to rewrite data or write data anew is carried out. When data are rewritten or written anew, the preprocess employed in the information read/write device in the present embodiment makes an access to a sector to which the data are to be rewritten or written, and quickly determines whether or not the sector is usable. Accordingly, a reliability of the read/write operation is remarkably improved without unnecessary consumption of time. A user can carry out the read/write process for a virginal recording medium having no information recorded therein without carrying out the "certify" processing. As a result, an extremely efficient work environment is provided for users.

Input/Output Process in the Computer

As shown in FIG. 1, the host computer 20 includes the input/output control portion 27. The input/output control portion 27 mainly includes the device driver 23, and has a write cache function in addition to the file buffering function. The write cache function is provided for realizing a high speed file access. In writing data, the data are temporarily stored in a memory, for example. At the end of storing the data, a write end signal is sent to the OS 21. Thereafter, at a proper time, the data are actually sent to the information read/write device 10 and recorded into the recording medium 11. In the input/output control portion 27 of the present embodiment, a part of the memory 22 in the computer is used for forming the device/driver information storing part 26. This device/driver information storing part 26 is used for the write cache.

The device/driver information storing part 26, like the device information storing portion 14 in the information read/write device 10, has a memory capacity of one cluster or two or more clusters in association with the read/write unit for the data transfer to and from the recording medium 11. If data, which is delivered in blocks of the read/write unit for the data transfer to and from the recording medium 11, is temporarily stored in the device/driver information storing part 26 in the computer by way of the input/output section 12 and the device driver 23, the read/write portion 16 may handle the input/output of data by a process similar to that for the device information storing portion 14. Further, the device information storing portion 14 in the information read/write device may be used as a write cache since the device driver 23 is connected to the device information storing portion 14, through the bus 30 and the communication portion 13.

In a case where the device driver 23 uses the device/driver information storing part 26 in the computer as a write cache, and data are transferred in blocks of the read/write unit between the device/driver information storing part 26 and the input/output section 12 in the information read/write device, the bus 30 is used for transmitting and receiving data in blocks of the read/write unit. In a case where the device driver 23 uses the device information storing portion 14 in the information read/write device as a write cache, or where the application 24b, which directly communicates with the information read/write device, not through the OS 21, is operating, data are transmitted or received in blocks of the read/write unit for data transfer by the OS 21 or the application 24b, e.g., a data unit of a sector.

Details of Read/Write Operation

The operation of rewriting the data recorded in the recording medium will be described in more detail with reference to FIGS. 10 to 11. The device/driver information storing part 26 in the computer and the device information storing portion 14 in the information read/write device have substantially the same functions in rewriting the recorded contents of the recording medium. In the description to follow, the device information storing portion 14 may be either of the device information storing portion 14 per se and the device/driver information storing part 26. Rewriting process description will be given on the basis of the data read/write unit by the OS. The same process is correspondingly applied to a software, such as the application 24b, which directly communicates with the information read/write device without using the OS.

Figure 10:
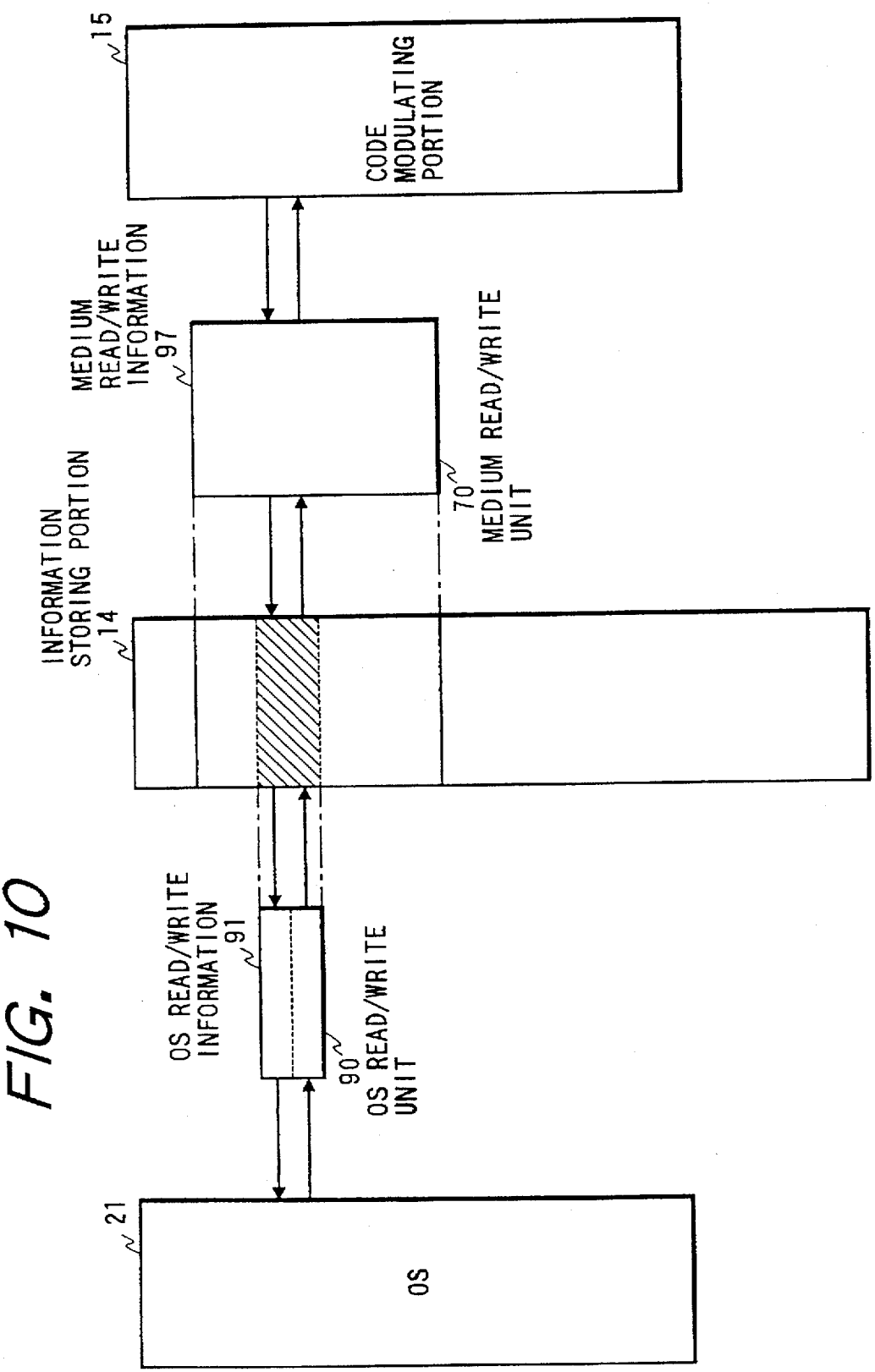
FIG. 10 is a diagram showing flows of information in writing and reading the information of different read/write units by the information storing portion.

In a case shown in FIG. 10, all the information of OS read/write information 91, which consists of a proper number of OS read/write units 90, are contained in medium read/write information 97 of a medium read/write unit 70. Between the read/write portion 16 and the recording medium 11, data are transferred in blocks of the cluster unit 61. The medium read/write unit for the transfer of the data handled in the device information storing portion 14 and the like may be that of the data not yet scrambled. Accordingly, data can be transferred in blocks of a data unit having the size capable of containing the logical cluster 70 except the before-data additional information 62 and the after-data additional information 63 shown in FIG. 2.

In a data reproduction or read mode, the medium read/write information 97 containing the OS read/write information 91, which is to be accessed for read by the OS 21, is read out of the recording medium 11 through the code modulating portion 15, in blocks of the medium read/write unit 70. The medium read/write information 97 reproduced or read out from the recording medium 11 is stored into the device information storing portion 14. Then, the OS read/write information 91, which is to be accessed for read by the OS 21, is picked out of the information stored in the operating portion 17, and sent to the OS 21.

In a data record or write mode, the medium read/write information 97 including the OS read/write information 91 is read out of the recording medium in blocks of the medium read/write unit, through the code modulating portion 15, and stored in the device information storing portion 14. Then, the OS read/write information 91 is received from the OS 21, and written over the medium read/write information 97 in the device information storing portion 14. In other words, the medium read/write information 97 is updated. Finally, the updated medium read/write information 97 is read out of the device information storing portion 14, and recorded or written into the recording medium, through the code modulating portion 15.

Figure 11:
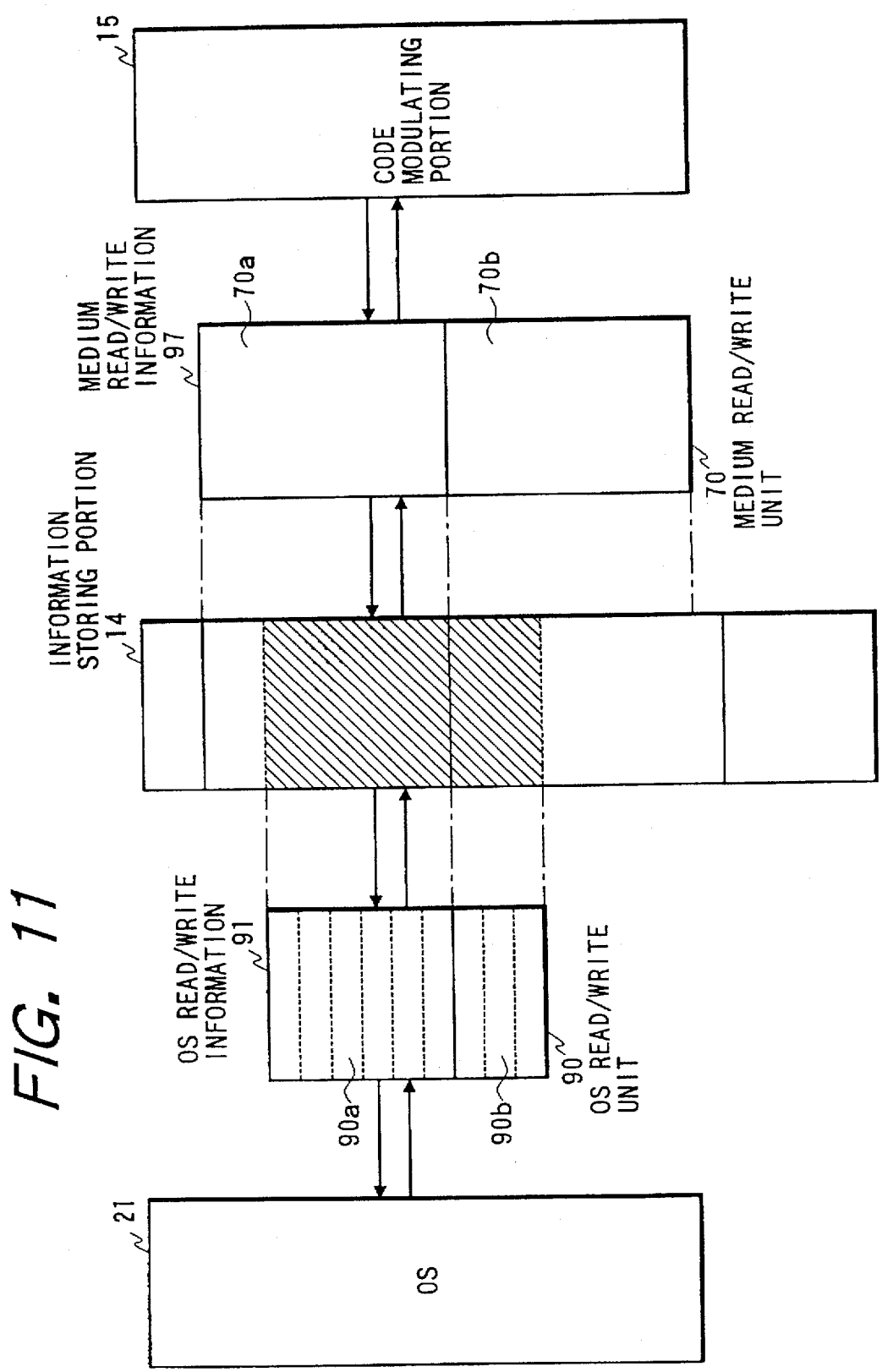
FIG. 11 is a diagram showing flows of information in writing and reading the information of different read/write units by the information storing portion.

In a case shown in FIG. 11, all the information of OS read/write information 91, which consists of a proper number OS read/write units 90, are contained in a plural number of medium read/write units 70. A first loading method for loading the plural number of the medium read/write units 70 covering all the OS read/write information 91 into the device information storing portion 14 or a second loading method for loading the medium read/write units 70 unit by unit into the device information storing portion 14 is selectively used depending on the memory capacity of the device information storing portion 14. The first loading method or the second loading method may be selected in use on the basis of the memory capacity of the device information storing portion 14 and other device environments. Further, a third loading method, which is a compromise between the first and second loading methods, may be used in which two or more medium read/write units 70 are loaded into the device information storing portion 14.

In the first loading method, in a data read mode, a first medium read/write unit 70a of the medium read/write information 97 containing first OS read/write units 90a of the OS read/write information 91 being accessed for read by the OS 21, and a second medium read/write unit 70b of the medium read/write information 97 containing second OS read/write units 90b of the OS read/write information 91 being accessed for read by the OS 21 are read out of the recording medium, through the code modulating portion 15, and then loaded into the device information storing portion 14. Then, the first OS read/write units 90a and the second OS read/write units 90b of the OS read/write information 91 being accessed for read by the OS 21 are picked up from the information stored in the device information storing portion 14, and sent to the OS 21.

In a data write mode, the first medium read/write unit 70a containing the first OS read/write units 90a of the OS read/write information 91 being not yet rewritten, and the second medium read/write unit 70b containing the second OS read/write units 90b of the OS read/write information 91 being not yet rewritten are read out of the recording medium, through the code modulating portion 15, and loaded into the device information storing portion 14. Then, the OS read/write information 91 to be rewritten are all received from the OS 21, and written, for updating, over the medium read/write information 97 in the device information storing portion 14. At this time, the first OS read/write units 90a of the OS read/write information 91 is written, for updating, into the locations of the first medium read/write unit 70a in the medium read/write information 97 in the information storing portion. The second OS read/write units 90b of the OS read/write information 91 is written, for updating, into the locations of the second medium read/write unit 70b of the medium read/write information 97 in the information storing portion. Finally, the updated medium read/write information 97 is read out of the device information storing portion 14, and written into the recording medium, through the code modulating portion 15.

In the second loading method, in a data read mode, the first medium read/write unit 70a of the medium read/write information 97 containing the first OS read/write units 90a of the OS read/write information 91 being accessed for read by the OS 21 is read out of the recording medium, through the code modulating portion 15, and loaded into the device information storing portion 14. The first OS read/write units 90a of the OS read/write information 91 being accessed for read by the OS 21 are picked up from the information stored in the device information storing portion 14, and sent back to the OS 21. Then, the second medium read/write unit 70b of the medium read/write information 97 containing the second OS read/write units 90b of the OS read/write information 91 being accessed for read by the OS 21 is read out of the recording medium, through the code modulating portion 15, and loaded into the device information storing portion 14. The second OS read/write units 90b of the OS read/write information 91 being accessed for read by the OS 21 are picked up from the information stored in the device information storing portion 14 and sent back to the OS 21.

In a data record or write mode, the first medium read/write unit 70a of the medium read/write information 97 containing the first OS read/write units 90a of the OS read/write information 91 being not yet rewritten is read out of the recording medium, through the code modulating portion 15, and loaded into the device information storing portion 14. The first OS read/write units 90a of the OS read/write information 91 to be rewritten is received from the OS 21, and written, for updating, over the first medium read/write unit 70a of the medium read/write information 97 in the device information storing portion 14. Thereafter, the updated first medium read/write unit 70a of the medium read/write information 97 is read out of the device information storing portion 14, and written into the recording medium, through the code modulating portion 15. Then, the second medium read/write unit 70b of the medium read/write information 97 containing the second OS read/write units 90b of the OS read/write information 91 being not yet rewritten is read out of the recording medium, through the code modulating portion 15, and loaded into the device information storing portion 14. The second OS read/write units 90b of the OS read/write information 91 to be rewritten is received, and written, for updating, over the second medium read/write unit 70b of the medium read/write information 97 in the device information storing portion 14. The updated second medium read/write unit 70b of the medium read/write information 97 is taken out of the device information storing portion 14, and loaded into the recording medium through the code modulating portion 15.

In the above-mentioned loading methods, no problem arises even if the read/write unit for the data transfer to and from the recording medium is different from the OS read/write unit for the data transfer to and from the OS. Accordingly, the system using any of the loading methods accepts any type of OSs whose read/write units are different, and is normally operable even when the specification of the recording medium is altered and the medium read/write unit thereof is changed. The second loading method or the third loading method as a compromise between the first and second loading methods, effectively operates when the memory capacity of the information storing portion is limited. When using the loading method, similar useful effects can be obtained even in such a system with the information storing portion of a small memory capacity or a system which cannot use the information storing portion because its manufacturing cost is limited. A user who uses the information read/write device based on any of these loading methods can use the device while being insensible of the read/write unit of an OS used. In these respects, the device simple in construction and low in cost can be constructed.

A case where an arbitrary number of OS read/write information are successively recorded into the medium read/write information 97 by operating the information storing portion in a write cache mode is shown in FIG. 12. In this case, record commands of four OS read/write information 91a to 91d are successively accepted.

When a record command of the first OS read/write information 91a is received from the OS 21, the medium read/write information 97 containing the first OS read/write information 91a being not yet rewritten is read out of the recording medium through the code modulating portion 15, and loaded into the device information storing portion 14. Then, the first OS read/write information 91a being not rewritten are all received from the OS 21, and written over the medium read/write information 97 in the device information storing portion 14, so that the written information 97 is updated into medium read/write information 97'. In this state, the device waits for the next command. The recording method under discussion, unlike the recording method already state, does not take such a processing that the updated medium read/write information 97' is immediately read out of the device information storing portion 14 and recorded into the recording medium. In the present recording method, in response to the next record command, check is made as to whether or not the information is recorded in the recording medium.

Next, a record command of the second OS read/write information 91b arrives from the OS 21. At this time, the medium read/write information 97' containing part of all the second OS read/write information 91b being not yet rewritten has been stored in the device information storing portion 14. Accordingly, there is no need of reading it out of the recording medium through the code modulating portion 15. Since the medium read/write information 97' resulting from updating the first OS read/write information 91a is not yet written, the first OS read/write information 91a is lost if the read-out from the recording medium is carried out. For this reason, in the process of this instance, a process in which the read-out from the recording medium is successively repeated is not carried out except a special case. Subsequently, the second OS read/write information 91b to be rewritten are all received, and written over the medium read/write information 97' in the device information storing portion 14, so that the information 97' is updated into medium read/write information 97". In this state, the device waits for the next record command. Thus, as in the previous case where the first OS read/write information 91a is received, a process that the medium read/write information 97" is recorded into the recording medium through the code modulating portion 15, is not carried out.

A process similar to the process upon receipt of the record command of the second OS read/write information 91b is carried out in response to a record command of the third OS read/write information 91c and a record command of the fourth OS read/write information 91d.

When those processings based on the record commands have been completed, the medium read/write information in the device information storing portion 14 is successively updated by the first OS read/write information 91a, second OS read/write information 91b, third OS read/write information 91c, and fourth OS read/write information 91d, so that medium read/write information 97"" is constructed. For the medium read/write information 97"", a record command for medium read/write information, which is different from the medium read/write information stored in the device information storing portion 14, close of a file, end of an application, preset elapsing times, and the like are taken out in the form of timings. The timings will be described in detail in the present specification. The medium read/write information 97"" is recorded into the recording medium through the code modulating portion 15. As a result, the OS read/write information containing all the first to fourth OS read/write information 91a to 91d are updated in the recording medium. This recording method will be referred to as an ex post facto recording method.

FIGS. 13(a) and 13(b) show the ex post facto recording method in the form of a flow of data between the OS 21 and the device information storing portion 14 with respect to time and a flow data between the device information storing portion 14 and the code modulating portion 15 with respect to time. FIG. 13(a) shows a flow of data when the ex post facto recording method is not used. FIG. 13(b) shows a flow of data when it is used.

In FIG. 13(a), at time t1, the information read/write device receives a record command for the first OS read/write information 91a from the OS 21, and reads the corresponding medium read/write information 97 from the recording medium through the code modulating portion 15, and loads it into the device information storing portion 14. At the end of the read-out operation, at time t2 the information read/write device receives the first OS read/write information 91a and writes over the medium read/write information in the device information storing portion 14, so that the medium read/write information is updated into the medium read/write information 97'. When the updating operation ends at time t3, the medium read/write information 97' is read out of the device information storing portion 14, and recorded into the recording medium through the code modulating portion 15. When the recording operation ends at time t5, the information read/write device sends a record end message to the OS 21. At time t7, the device receives a record command of the second OS read/write information 91b from the OS 21, reads the corresponding medium read/write information 97' from the recording medium through the code modulating portion 15, and loads it into the device information storing portion 14. At the completion of the read-out operation, at time t10 the second OS read/write information 91b is received and written over the medium read/write information in the device information storing portion 14, so that it is updated into medium read/write information 97" At time t11, the updating operation ends. Then, the medium read/write information 97" is read out of the device information storing portion 14 and recorded into the recording medium through the code modulating portion 15. At time t14, the recording operation ends. Then, the device sends a record end message to the OS 21. A similar processing is successively applied to the third OS read/write information 91c and the fourth OS read/write information 91d. At time t23, the contents of the four OS read/write information are updated into medium read/write information 97"" which in turn is recorded into the recording medium.

When the ex post facto recording method is used, the process till time t3 is the same as that of the previous case as shown in FIG. 13(b). At time t3, the medium read/write information is updated in the device information storing portion 14. Then, the information read/write device immediately sends a record end message to the OS 21. In response to this, the OS 21 sends a record command for the second OS read/write information 91b at time t4. In response to this command, the information read/write device receives second OS read/write information 91b and updates the medium read/write information 97 since the medium read/write information 97 containing a data area corresponding to the second OS read/write information 91b is present in the device information storing portion 14. At time t6, the updating operation ends. Then, the device sends a record end message to the OS 21. Upon receipt of the message, the OS 21 issues a record command for the third OS read/write information 91c at time t8. A similar process is carried out for the third OS read/write information 91c and the fourth OS read/write information 91d. At time t13, the medium read/write information 97 in the device information storing portion 14 is updated by the first to fourth OS read/write information 91a to 91d into medium read/write information 97"". Thus, when the ex post facto recording method is used, the updating operations of the four OS read/write information is halved. The time saving effect by the ex post facto recording method is more effective as the number of OS read/write information increases. Further, there is a high probability that the data to be updated are closely located. Then, the opportunity to reduce the process time by the ex post facto recording method is very frequent.

After the OS 21 receives a record end message at time t13, the recording operation for the recording medium starts at predetermined timing. Through the recording operation, the medium read/write information resulting from the updating by the first to fourth OS read/write information is recorded into the recording medium through the code modulating portion 15.

Thus, when the ex post facto recording method is used, the process in the route including the device information storing portion 14, the code modulating portion 15 and the recording medium 11, viz., the read/write process of the medium read/write information 97', 97", 97'" and 97"" as shown in FIG. 13(a) can be omitted. Therefore, the time taken for the updating is remarkably reduced. Thus, the record executing time is considerably reduced. When a record command from the OS is issued to the same medium read/write information, the record execution time is remarkably reduced. When the medium read/write unit is large, the time taken for the read/write process of FIG. 13(a) increases in proportion to the size of the medium read/write information. When the ex post facto recording method is applied to a device whose medium read/write unit is large, like the information read/write device 10, the process time reduction effect by the ex post facto recording method is considerably large. The reduction of the number of the read/write commands leads to the reduction of the number of the operations of writing information to the recording medium. As a result, a reliability of the recording medium is improved.

When the ex post facto recording method is employed for the information read/write device, it is preferable to use an information storing portion large enough to store several medium read/write units. By so doing, a more quick response to the read/write command from the OS is realized.

In the above-mentioned embodiment, four OS read/write information are written over the same medium read/write information and stored. When more than four OS read/write information are written over the medium read/write information and stored, the process time reduction effect is further enhanced as described above.

The process effect that has been described with reference to FIGS. 10 to 13 is obtained in both the information read/write device 10 and the host computer 20, as described above. If the device/driver information storing part 26 and the device driver 23 in the host computer 20 are used for the process of updating the information, the process speed is further improved. FIG. 14 shows a flow of data in a case where the device driver 23 and the device/driver information storing part 26 in the input/output control portion 27, which is contained in the host computer, are used for the updating process, and the above-mentioned read/write information unit conversion method and the ex post facto recording method are employed. In the figure, the operation of the device driver 23 in this device is described in the form of a flow of data between the OS 21 and the device driver 23, and a flow of data between the device driver 23 and the information read/write device 10 (corresponding to the bus 30). In the case shown in FIG. 14, three record commands for the first to third OS read/write information 91a to 91c are successively issued.

In FIG. 14, at time t31, the device driver 23 receives an information handling start command from the OS 21, and recognizes that information in the information read/write device 10 is to be written and read out. Thereafter, at time t32, the OS 21 issues a record command for the first OS read/write information 91a toward the device driver 23. Upon receipt of the record command for the first OS read/write information 91a, the device driver 23 operates according to the read/write information unit conversion method, and at time t33 issues a read command for the related medium read/write information 97 toward the information read/write device 10. In response to the read command, the information read/write device 10 reads out the medium read/write information 97 in blocks of the medium read/write unit, from the recording medium. At time t34, the device transfers the medium read/write information 97 to the device driver 23 by way of the bus 30, and sends an end procedure to the device driver 23. Then, the device driver 23 stores the medium read/write information 97 containing a data area corresponding to the first OS read/write information 91a being not yet rewritten in the device/driver information storing part 26, in the state of the medium read/write unit, and at time t35 receives the first OS read/write information 91a to be rewritten, from the OS 21. Then the device driver updates the medium read/write information 97 into medium read/write information 97' in the device/driver information storing part 26. At time t36, the overwriting and storing process ends, and the device driver 23 issues a first write end procedure to the OS 21.

In response to this, at time t37, the OS 21 issues a record command for the second OS read/write information 91b to the device driver 23. In response to this command, the device driver 23 immediately receives the second OS read/write information 91b to be rewritten from the OS 21, and carries out the overwriting and storing process in the device/driver information storing part 26 since the medium read/write information 97 to be rewritten has been present in the device/driver information storing part 26. At time t38, the overwriting and storing process ends, the device driver 23 issues a second record end procedure to the OS 21.

At time t39, a record command for the third OS read/write information 91c is issued from the OS 21 to the device driver 23. In response to this command, the device driver 23 immediately receives the third OS read/write information 91c to be rewritten from the OS 21 since the related medium read/write information 97 to be rewritten has been present in the device/driver information storing part 26. In the device/driver information storing part 26, the overwriting and storing process is carried out and medium read/write information 97''' is produced. At time t40, the overwriting and storing process ends, the device driver 23 issues a third record end procedure to the OS 21.

Thereafter, the OS 21 recognizes that the operations by all the record commands have been completed, and at time t41, it issues an information handling end command to the device driver 23. This information handling end command, issued by the OS 21, is used for informing the device driver 23 that no further read/write process for the information will be carried out. In this instance, this command is used as the predetermined timing to record information into the recording medium. The information handling start command issued at time t31 and the information handling end command issued at time t41 are used within the host computer 20, and not directed to the information read/write device 10. These information handling start command and the information handling end command are issued at time positions to start and to leave off the read/write process of information. Therefore, it is most suitable for the timing at which information is recorded. The device driver 23, at time t41, receives the information handling end command, and at time t42, issues a record command to the information read/write device 10, so as to cause the device to write medium read/write information into the recording medium. At the same time, the device driver 23 transfers the medium read/write information 97''', which is stored in the device/driver information storing part 26, through the bus 30 to the information read/write device 10. Upon receipt of the record command, the information read/write device 10 receives the medium read/write information 97''', and writes it into the recording medium. At the completion of the recording of the information, at time t43, the information read/write device sends an end procedure to the device driver 23.

As described above, by using the device/driver information storing part 26 in the memory of the host computer, the information handling end command computer may be used as host computer may be used as the predetermined timing. By using the timing, information may be written into the recording medium by the ex post facto recording method. With the recording of information into the recording medium by the information handling command, when a power source of the information read/write device is different from that of the host computer, and the former power source is turned off, displayed characters in the host computer can give a user warning. In other words, a good data protection is secured. Also when the recording medium is removed from the information read/write device, the displayed characters give the user warning. With this function, when the user mistakenly understands that information has been recorded into the recording medium, and removes the recording medium from the information read/write device or turns off the power switch, the display in the host computer arouses the user's attention. After seeing the display, the user restores the information read/write device to its original state, and can use the information still alive in the memory of the host computer.

Since the number of the read/write commands issued to the information read/write device is reduced, a high speed file access is realized.

While in the present embodiment, three record commands are successively issued from the OS to the device driver, more than three record commands may be successively issued, and the record command and the read command may be used in a mixed way.

Input/Output Process by an Application

A process in which the application shown in FIG. 1 inputs and outputs data to and from the recording medium 11 by using the information read/write device 10, will be described. The application includes an application 24a for inputting and outputting data through the OS, and the application 24b which directly accesses the information read/write device 10, not through the OS, and inputs and outputs data to and from the recording medium.

A case where the application 24a writes data into and reads data from the recording medium 11 by using the information read/write device 10, will be described. When the application 24a desires to use specific information, viz., in a data read mode, the application issues a read command to the device driver 23, through the OS 21. In response to this command, the device driver 23 converts the OS read/write unit to the medium read/write unit by using the read/write information unit conversion method, in the device/driver information storing part 26. As a result, the device driver 23 issues a read command to the information read/write device 10 so as to read out medium read/write information of the converted medium read/write unit. The information read/write device 10 receives the read command by the communication portion 13, and the control portion 18 controls the blocks to read out the medium read/write information from the recording medium 11, and sends the read out information to the device driver 23 in the host computer 20, through the communication portion 13. In turn, the device driver 23 sends OS read/write information to the OS 21 by using the read/write information unit conversion method, in the device/driver information storing part 26. The OS 21 transfers this information to the application 24a. By the process flow, one read command of the application 24a is executed.

When the application 24a desires to store specific information into the recording medium 11, viz., in a data write mode, the flow of information is reversed. An information record command and information are transferred to the device driver 23 through the OS 21. Then, the device driver 23 records information into the recording medium 11 through the communication portion 13 in the information read/write device 10, by the read/write information unit conversion method using the device/driver information storing part 26, and the ex post facto recording method.

The application 24b directly writes information into and reads information from the recording medium, not through the OS and the device driver. When the application 24b desires to use information, viz., in a data read mode, it issues an information read command to the communication portion 13 in the information read/write device 10. In response to this command, the control portion 18 converts the read/write unit of the application 24b to the medium read/write unit by the read/write information unit conversion method that is operated in the device information storing portion 14 of the information read/write device. The read/write unit may be exactly equal to the OS read/write unit. The program per se of the application 24b runs under control of the OS 21, and hence it can know the OS read/write unit. When the application 24b releases the information read/write device and another application uses the information read/write device 10, the application 24b is placed to a read/write impossible state. To avoid this, it is preferable to set the read/write unit to be exactly equal to the OS read/write unit. After the information read/write unit of the application 24b is converted, the control portion 18 controls other blocks to read the medium read/write information at the medium read/write unit, from the recording medium 11, and loads it to the device information storing portion 14. The control portion 18 converts the read/write unit of the read out medium read/write information 97 to the information read/write unit of the application 24b, and sends the read out information at the converted read/write unit to the application 24b, through the communication portion 13, and ends the read process.

When the application 24b desires to store specific information, viz., in a data write mode, the application 24b directly delivers an information read/write command and information to the communication portion 13 in the information read/write device 10. The control portion 18 in the information read/write device 10 converts the read/write unit of the application 24b to the medium read/write unit by the read/write information unit conversion method using the device information storing portion 14, and writes information into the recording medium 11 by controlling other blocks.

As described above, in the information read/write device 10, the device information storing portion 14 capable of storing data of the medium read/write unit is included in the input/output section 12. With provision of the device information storing portion 14, the read/write unit of data is converted and recorded in the device information storing portion. Therefore, if a user uses an application which directly accesses the information read/write device, not through the OS and the device driver, and inputs and outputs data to and from the recording medium, no problem arises and a recording medium of large read/write unit, such as the CD rewritable at high processing speed, can be used. The data written or read out under control of the OS is not destroyed even if the power source of the information read/write device is turned off or the recording medium is removed therefrom. In other words, a good data protection is secured. When data are written or read out not using the OS, the data are left in the device information storing portion in the information read/write device. Therefore, the data can be protected even if the recording medium is mistakenly removed from the information read/write device.

Timing of Record

A time point of reading out OS read/write information for different medium read/write information or of issuing a record command, a time point of issuing an information handling end command used within the host computer, and the like may be used as the timing to write information updated or prepared at the medium read/write unit by the read/write information unit conversion method and the ex post facto recording method into the recording medium. In a case where the device/driver information storing part 26 necessary for using the read/write information unit conversion method and the ex post facto recording method secures its memory capacity of the minimum medium read/write unit in the memory 22 when the host computer 20 is started up, for example, four medium read/write units are secured for the device/driver information storing part 26, how information is inputted to and outputted from the information read/write device 10 will be described.

An information handling end command as the predetermined timing in the ex post facto recording method may be used in both the read/write operation using the OS 21 and the device driver 23 and the read/write operation without using them. However, before the information read/write end command is issued, there is a case that the entire memory area of the device/driver information storing part 26 is filled with the medium read/write information, which is not recorded in the recording medium, viz., a buffer full is set up. If the information read/write end command alone is used as the predetermined timing in this full buffer state, no response is possible to an information read/write command for the medium read/write information, not present in the device/driver information storing part 26. Accordingly, after the buffer full state, when a read/write command for the medium read/write information, not present in the device/driver information storing part 26, is received from the OS 21, an instant that the read/write command is received (a buffer full timing) is also used as the predetermined timing, and the medium read/write information in the device/driver information storing part 26 is recorded. As a result, the memory area of the device/driver information storing part 26, which is occupied by the medium read/write information recorded in the recording medium or transferred to the information read/write device 10, may be used for storing the medium read/write information to be read out by a read/write command from the OS 21.

An eject command issued from the information read/write device 10 may be used as timing, and the information that is stored in the device information storing portion 14 or the device/driver information storing part 26, is recorded into the recording medium. When the application ends its operation, it closes the file under control of the OS. This is true for most of the applications. Accordingly, if this command is used as the timing, the data that have been formed or rewritten are read out of the device information storing portion 14 or the device/driver information storing part 26, and recorded into the recording medium. Some of the applications do not issue file close commands. In such applications, the data that have been formed or updated are left while not recorded. This problem may be solved in a manner that the data of the device information storing portion 14 or the device/driver information storing part 26 are recorded into the recording medium in response to an eject command for ejecting the recording medium. By so doing, such an unwanted situation that the data formed or updated during the operation of the application disappears while not recorded can be avoided.

The timer 25 is included in the input/output control portion 27. By using the timer, preset elapsing times may be written as timings into the recording medium. A situation that a read/write command has not been issued for a long time from the OS 21, and an information handling command has also not been issued for a long time, rarely takes place. However, this is very dangerous situation in keeping the recorded data. To avoid this, intervals of times the read/write commands are received from the OS 21 are measured by the timer 25. When a read/write command is not issued for a preset time from the OS 21, the medium read/write information, which is stored in the device/driver information storing part 26 and not yet recorded into the recording medium, is transferred to the information read/write device 10 and recorded into the recording medium 11.

If the buffer full timing and a time elapsing from the final read/write operation are used for the given timings, in addition to the information handling end command, a stability and a reliability of the information read/write device are remarkably improved.

It is evident that the data structure and the number of bytes of the cluster, for example, are not limited to those mentioned above. In the above-mentioned embodiment, the information storing portions are included in the information read/write device and the host computer, respectively. However, even if an information storing portion is included in either of them, the information of different read/write units may smoothly be converted as described above.

As described above, where the preprocess of the present invention is used, it is possible to determine whether or not a sector is usable by using the medium position information previously recorded in the recording medium and the record position information protected by a strong error correction code, and by making use of a difference of the easiness of read error occurrence between those position information. Further, the occurrence of unusable sectors may be controlled to be a proper quantity for a recording medium used, by properly selecting a defect factor of the recording medium and an error rate of the medium position information. Where the preprocess is used, a process can be carried out while judging whether or not a sector is usable, without certifying the recording medium. Accordingly, a user can effectively use the recording medium of large memory capacity in good work environment, not bothering with the "certify" process consuming tremendous time.

The information storing portion for temporarily storing information of the read/write unit equal to or larger than that of the recording medium is used in the present invention. With provision of the information storing portion, the read/write process can stably be carried out in the information read/write device, independently of external factors, such as the transfer rate of the host computer.

It should be understood that the above described embodiment may variously be changed, modified and altered within the present invention. For example, the present invention is applicable to a mini disc, usually abbreviated as MD, which uses the CIRC as basic structure.

Further, by using the information storing portion, the read/write unit of the data recorded in the recording medium is easily converted into the read/write unit of the data received from the OS, for example, and vice versa. Accordingly, the device can deal with all the read and write commands from the OS. When a plural number of recorded information are temporarily stored in the information storing portion, and then are recorded at given timing, a further improvement of the processing speed is secured. In a device where the read/write operations are repeated several times, the execution time for these write operations is omitted, and hence the information recording speed is further improved.

When the information storing portion is provided outside the information read/write device, for example, in the host computer, the information updating speed is improved. Further, when the power source of the information read/write device is turned off or the recording medium is removed therefrom, there is eliminated the information being left unrecorded. In this respect, an excellent data protection is secured in the information read/write device. When an instant that an information handling end command, synchronized with the OS, is used for the given timing to record information into the recording medium, a further reduction of the record execution time and a safety of process are secured.

Also, it is evident that the processing method and the input/output device, which use the information storing portion, are applicable to normal read-only CDs, in addition to rewritable CDs. Accordingly, rewritable CDs and read only CDs can be driven by a single information read/write device. In other words, a user can use the information read/write device without bothering the type of CDs used such as a rewritable CD or read only CD.

What is claimed is:

1. A preprocessing method in which it is judged whether or not a sector as a unit record area on a readable/writable recording medium can be used, the method comprising the steps of:

reading record position information written into said sector in a rewritable state and with an error correction code;

reading unrewritable medium position information provided in advance on said recording medium and indicating a position of said sector; and judging a whether or not said sector is usable on the basis of combination of a state of reading said record position information and a state of reading said medium position information, said sector is judged as usable when said record position information is normally read out, said sector is judged as usable when said record position information is not normally read out and the number of operations of abnormally reading said medium position information in succession is smaller than an integer $\underline{n}$, and said sector is judged as unusable when said record position information is not normally read out and the number of operations of abnormally reading said medium position information in succession is equal to or larger than an integer $\underline{n}$, where the integer $\underline{n}$ satisfies the following inequality (1)

$$\{(\text{defect factor})\div(\text{number of sectors in one cluster})\} < (\text{rate of occurrence of medium position information error})^n \quad (1)$$

where, defect factor=(unusable capacity by defect)/(total record capacity of said record medium).

2. The preprocessing method according to claim 1, in which the integer $\underline{n}$ is the largest integer of those satisfying the inequality (1).

3. An input/output device, comprising:

a read/write portion for inputting data to and outputting data from a readable/writable recording medium in blocks of a sector as a unit recording area;

a code modulating portion for coding and decoding said data; and an operating portion for judging whether or not said sector is usable depending on a state of medium position information indicative of a position of said sector, which is written in advance in said recording medium and unrewritable, said medium position information being obtained through said read/write portion, and a state of record position information which is written into said sector in a rewritable state and obtained through said code modulating portion, said operating portion having the ability to count the number of operations of abnormally reading said medium position information in succession and judging that said sector is unusable when the number of operations of abnormally reading said medium position information in succession is equal to or larger than an integer $\underline{n}$, where the integer $\underline{n}$ satisfies the following inequality (1)

$$\{(\text{defect factor})\div(\text{number of sectors in one cluster})\} < (\text{rate of occurrence of medium position information error})^n \quad (1)$$

where, defect factor=(unusable capacity by defect)/(total record capacity of said record medium).

4. The input/output device according to claim 3, in which the integer $\underline{n}$ is the largest integer of those satisfying the inequality (1).

5. An input/output device, comprising:

a read/write portion for inputting data to and outputting data from a readable/writable recording medium in blocks of a sector as a unit recording area;

a code modulating portion for coding and decoding said data; and an operating portion for judging whether or not said sector is usable depending on a state of medium position information indicative of a position of said sector, which is written in advance in said recording medium and unrewritable, said medium position information being obtained through said read/write portion, and a state of record position information which is written into said sector in a rewritable state and obtained through said code modulating portion;

an information storing portion which has memory capacity equal to or larger than an information read/write unit for said recording medium, and is capable of temporarily storing said data before coding or after decoding;

a first input/output portion for transferring first read/write information with at least one said information read/write unit between said information storing portion and said recording medium; and a second input/output portion for transferring second read/write information with at least one second information read/write unit smaller than said first information read/write unit between said information storing portion and an external input/output terminal.

* * * * *